(12) United States Patent
Senarath et al.

(10) Patent No.: US 10,321,285 B2
(45) Date of Patent: Jun. 11, 2019

(54) METHOD AND APPARATUS FOR CHARGING OPERATIONS IN A COMMUNICATION NETWORK SUPPORTING VIRTUAL NETWORK CUSTOMERS

(71) Applicants: Nimal Gamini Senarath, Ottawa (CA); Hang Zhang, Nepean (CA)

(72) Inventors: Nimal Gamini Senarath, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/880,056

(22) Filed: Jan. 25, 2018

(65) Prior Publication Data

US 2018/0220276 A1 Aug. 2, 2018

Related U.S. Application Data

(60) Provisional application No. 62/451,490, filed on Jan. 27, 2017, provisional application No. 62/451,401, filed on Jan. 27, 2017.

(51) Int. Cl.

| | |
|---|---|
| *H04M 11/00* | (2006.01) |
| *H04W 4/24* | (2018.01) |
| *H04L 12/14* | (2006.01) |
| *H04M 15/00* | (2006.01) |
| *H04W 4/02* | (2018.01) |
| *H04W 24/08* | (2009.01) |

(52) U.S. Cl.
CPC ............ *H04W 4/24* (2013.01); *H04L 12/1403* (2013.01); *H04M 15/66* (2013.01); *H04M 15/8016* (2013.01); *H04W 4/02* (2013.01); *H04W 24/08* (2013.01)

(58) Field of Classification Search
CPC ......... H04W 4/24; H04W 4/02; H04W 24/08; H04W 16/14; H04M 15/66; H04M 15/8016; H04L 12/1403; G06Q 30/02; G06Q 30/04
USPC ................... 455/406; 370/216, 352; 379/230
See application file for complete search history.

(56) References Cited

U.S. PATENT DOCUMENTS

| | | |
|---|---|---|
| 7,849,173 B1 | 12/2010 | Uhlik |
| 2002/0152319 A1 | 10/2002 | Amin et al. |
| 2009/0205046 A1 | 8/2009 | Radosavac et al. |
| 2011/0276447 A1* | 11/2011 | Paul ....................... G06Q 30/02 705/34 |

(Continued)

FOREIGN PATENT DOCUMENTS

| | | |
|---|---|---|
| EP | 2993820 A1 | 3/2016 |
| WO | 2016192640 A1 | 12/2016 |

*Primary Examiner* — Mahendra Patel

(57) ABSTRACT

Methods and apparatus for supporting customer charging in 5G networks are provided. Monitoring functions are instantiated at selected network locations for tracking access to network services. The monitoring functions provide charging information for use in customer billing. A customer can enter a service level agreement with a particular customized method of charging for service usage, and the monitoring functions can be customized to provide charging information according to the service level agreement. Charging can vary based on factors such as time of day, network congestion, service traffic characteristics, and geographic location.

27 Claims, 19 Drawing Sheets

(56) References Cited

U.S. PATENT DOCUMENTS

| | | | |
|---|---|---|---|
| 2012/0233302 A1* | 9/2012 | Kallin | H04L 41/5025 709/221 |
| 2013/0007232 A1 | 1/2013 | Wang et al. | |
| 2013/0303114 A1* | 11/2013 | Ahmad | H04W 16/14 455/406 |
| 2014/0016464 A1 | 1/2014 | Shirazipour et al. | |
| 2014/0269295 A1* | 9/2014 | Anumala | H04L 41/08 370/235 |
| 2014/0362700 A1 | 12/2014 | Zhang et al. | |
| 2016/0156513 A1* | 6/2016 | Zhang | H04W 4/70 709/220 |
| 2016/0352645 A1 | 12/2016 | Senarath et al. | |
| 2016/0352924 A1 | 12/2016 | Senarath et al. | |
| 2016/0353268 A1* | 12/2016 | Senarath | H04W 4/24 |
| 2016/0353422 A1* | 12/2016 | Vrzic | H04W 16/02 |
| 2016/0353465 A1* | 12/2016 | Vrzic | H04W 12/06 |
| 2016/0359682 A1* | 12/2016 | Senarath | H04W 16/14 |
| 2018/0287891 A1 | 10/2018 | Shaw et al. | |
| 2018/0352501 A1 | 12/2018 | Zhang et al. | |

* cited by examiner

METHOD AND APPARATUS FOR CHARGING OPERATIONS IN A COMMUNICATION NETWORK SUPPORTING VIRTUAL NETWORK CUSTOMERS

CROSS-REFERENCE TO RELATED APPLICATIONS

The present application claims priority from U.S. Provisional Patent Application No. 62/451,401 filed on Jan. 27, 2017, and U.S. Provisional Patent Application No. 62/451,490, filed on Jan. 27, 2017, both of which are incorporated herein by reference in their entirety.

FIELD OF THE INVENTION

The present invention pertains to the field of communication networks and in particular to a method and apparatus for charging operations in a host communication network. This may additionally or alternatively be a network supporting virtual network customers with different charging needs for end users.

BACKGROUND

Existing wireless and mobile networks such as third-generation (3G) and fourth-generation (4G) networks typically address usage based charging by tracking data traffic on a per-user equipment (UE) basis. This collected charging information can then be sent to an accounting system (typically within a management plane, or within an Operation Support Subsystem (OSS)/Business Support Subsystem (BSS)). Typically UE data consumption is charged according to a static set of charging rules. Typically a Mobile Network Operator (MNO), or a Mobile Virtual Network Operator (MVNO) track subscriber data consumption, and then apply billing rules in the OSS/BSS. These billing rules may include a fixed data allocation to be associated with a monthly subscription and charges for overages, a per bit/byte/megabyte (etc.) charge for all data consumed, etc. There may be times of day in which consuming network resources is discounted across the network (e.g. free phone calls or a reduced rate for data consumption during evenings and weekends).

In next generation mobile networks (e.g. so-called Fifth-generation (5G) networks), new network architectures and services to be offered are expected to differ in a variety of ways from previous generations of mobile networks. For example, 5G networks may utilize technologies such as network slicing and network function virtualization to dynamically provide customized virtual networks. A Network Operator in a 5G deployment may not be the entity that has a billing relationship with the subscribers, and it may not necessarily own the infrastructure through which a device such as an electronic device, mobile device or UE (terms that will be largely used interchangeably) connects. Particular end user groups may also commission and use customized virtual networks for their own members. The network operator providing the network services to such a virtual network may provide the services for a fee.

The document "3GPP TS 32.101; Technical Specification; 3rd Generation Partnership Project; Technical Specification Group Services and System Aspects; Telecommunication management; Principles and high level requirements," Release 13, V13.0.0, January 2016, establishes and defines the management principles and high-level requirements for the management of public land mobile networks (PLMNs). FIG. 1, which is a reproduction of FIG. 6.1 of the above-mentioned 3GPP document, illustrates an operational process model based on the Enhanced Telecom Operations Map®. The document identifies a need for automated processes to support the illustrated vertical end-to-end, customer operations processes of fulfillment, assurance, and billing, as well as operations support and readiness processes. However, billing processes have not been developed which adequately address the particular needs of new network architectures and new service providers.

Accordingly, it may be desirable to develop charging methods and systems which are appropriate to the capabilities and services of next generation mobile networks. Therefore there may be a need for a method and apparatus for charging operations in a communication network that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for charging operations in a communication network, such as a 5G network. In accordance with embodiments of the present invention, there is provided a method for collecting charging information associated with a customer for use of a service offered using a network slice in a communication network, the method comprising: instantiating a monitoring function at a location in the communication network, the location selected to allow monitoring or tracking of traffic flows associated with a UE that is using the service offered to the customer, and terminating within the communications network, the monitoring function configured to monitor said traffic flows and to provide indications of the traffic flows; and providing charging information for use in billing the customer based on the indications of the traffic flows. The method may additionally or alternatively further comprise providing a virtual network for use by a virtual network (VN) operator, the virtual network associated with one or more end-to-end service requirements, the VN operator serving a plurality of end devices.

In accordance with embodiments of the present invention, there is provided a method for collecting network usage information. The method includes instantiating a monitoring function at a location in a communication network. The location is selected to allow monitoring or tracking of traffic flows associated with a plurality of UEs using a network slice instantiated in the communication network. The plurality of UEs use the network slice to access a service. The monitoring function is configured to monitor the traffic flows and to provide indications of the traffic flows. The method further includes providing charging information for use in charging a virtual network operator (VNO) customer based on the indications of the traffic flows. The plurality of UEs are subscribed to the VNO customer or operated by the VNO customer.

In accordance with embodiments of the present invention, there is provided a method for collecting network usage information. The method includes instantiating a monitoring function at a location in a communication network. The location is selected to allow monitoring of traffic flows associated with usage, by one or more UEs, of a network slice instantiated in the network. The monitoring function is configured to monitor the traffic flows. The one or more UEs use the network slice in accordance with a subscription to a service provided by a virtual network operator (VNO). The method further includes generating, by the monitoring function, network usage information based on the traffic flows. The method further includes providing the network usage information to the VNO for use by the VNO in charging for usage of the network slice by the one or more UEs.

In accordance with embodiments of the present invention, there is provided a method for collecting charging information associated with a customer for use of a service offered in a communication network, the method comprising: instantiating a monitoring function at a mobility anchor point associated with a UE, to allow monitoring of traffic flows associated with the UE in accordance with a location of the UE with respect to a topology of the communications network.

In accordance with embodiments of the present invention, there is provided a method for providing a service to a customer via a communication network, comprising: providing information indicative of the service to the customer; receiving a service request from the customer; verifying capacity of the communication network to provide the service; providing the service according to a negotiated agreement; monitoring usage of the service; and charging the customer or another party based on the monitored usage of the service. In some embodiments, the method further comprises modifying the service request according to one or both of: current network conditions; and customer preferences.

In accordance with embodiments of the present invention, there is provided an apparatus comprising one or more computing devices in a network and configured to: instantiate a monitoring function at a location in the communication network, the location selected to allow monitoring or tracking of traffic flows associated with a UE and terminating within the communications network, the monitoring function configured to monitor said traffic flows and to provide indications of the traffic flows; and provide charging information for use in billing the customer based on the indications of the traffic flows. The apparatus may additionally or alternatively be further be configured to provide a virtual network for use by a virtual network (VN) operator, the virtual network associated with one or more end-to-end service requirements, the VN operator serving a plurality of end devices.

In accordance with embodiments of the present invention, there is provided an electronic device in a network, the electronic device comprising a processor, a network interface and a memory. The device is configured to instantiate or operate a monitoring function at a location in a communication network. The location is selected to allow monitoring of traffic flows associated with usage, by a plurality of UEs, of a service accessed via a network slice instantiated in the network. The monitoring function is configured to monitor the traffic flows for the plurality of UEs. The monitoring function is further configured to generate indications of the traffic flows. The monitoring function is further configured to generate and provide charging information for use in charging a Virtual Network Operator (VNO) customer based on the indications of the traffic flows. The plurality of UEs are subscribed to the VNO customer or operated by the VNO customer.

In accordance with embodiments of the present invention, there is provided an electronic device in a network, the electronic device comprising a processor, a network interface and a memory. The device is configured to instantiate or operate a monitoring function at a location in a communication network. The location is selected to allow monitoring of traffic flows associated with usage, by one or more UEs, of a service accessed via a network slice instantiated in the network. The one or more UEs are subscribed to the service via a Virtual Network Operator (VNO). The monitoring function is configured to monitor the traffic flows for the one or more UEs. The monitoring function is further configured to generate network usage information based on the traffic flows. The monitoring function is further configured to provide the network usage information to the VNO, for use by the VNO in charging for usage of the network slice by the one or more UEs.

In accordance with embodiments of the present invention, there is provided an apparatus for collecting charging information associated with a customer for use of a service offered in a communication network, the apparatus comprising one or more computing devices in a network and configured to instantiate a monitoring function at a mobility anchor point associated with a UE, to allow monitoring of traffic flows associated with the UE in accordance with a location of the UE with respect to a topology of the communications network.

In accordance with embodiments of the present invention, there is provided an apparatus comprising one or more computing devices in a network and configured to: provide information indicative of the service to the customer; receive a service request from the customer; verify capacity of the communication network to provide the service; provide the service according to a negotiated agreement; monitor usage of the service; and charge the customer or another party based on the monitored usage of the service.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
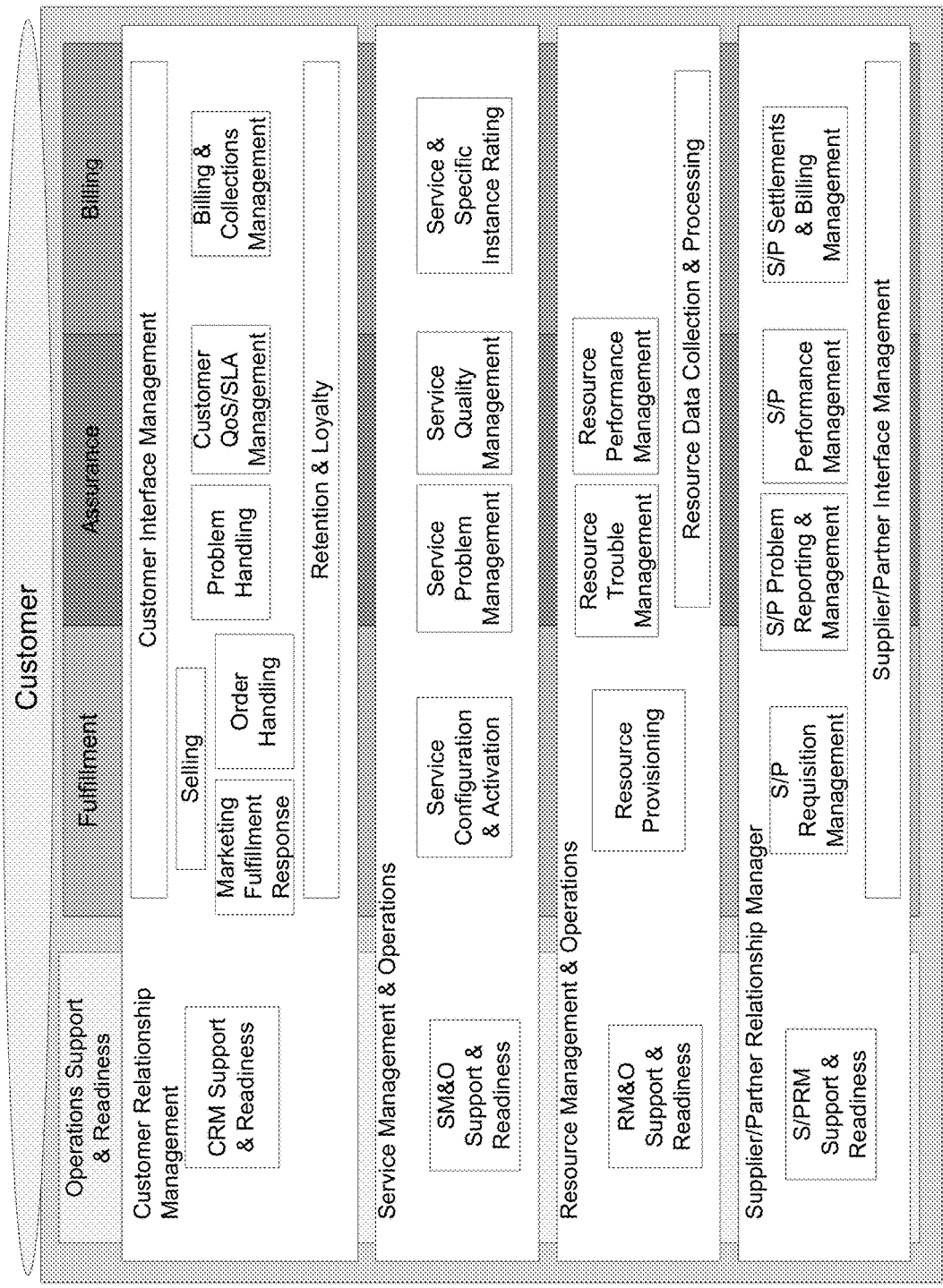
FIG. 1 illustrates a process model based on the Enhanced Telecom Operations Map®, according to the prior art.

As used herein, the terms Electronic Device (ED), "User Equipment" (UE) and "mobile device" are used to refer to one of a variety of devices, such as a consumer or machine-type device, which communicates with an access node via wireless communication. One skilled in the art will appreciate that a mobile device is a device designed to connect to a mobile network. This connection typically makes use of a wireless connection to an access node. An access node may be a base station, Wi-Fi™ access point, NodeB, evolved NodeB, gNodeB, or other device which provides a point of access to a backhaul network. Although the mobile network is designed to support mobility, it is not necessary that the mobile device itself be mobile. Some mobile devices, such as metering devices (e.g., smart meters) may not be capable of mobility, but still make use of the mobile network.

As used herein, a "network" or "communication network" or "mobile network" may provide communication services to various devices including but not necessarily limited to mobile devices. A mobile device can communicate with radio nodes using a protocol and have its data routed to a designated destination. Such a network may include a radio access portion and backhaul portion. The network may further comprise various virtualized components as will become readily apparent herein.

As used herein, Operations Support Systems (OSS) refer to software (and sometimes hardware) systems that support back-office activities for operation of a network and provision of customer services.

As used herein, Business Support Systems (BSS) refer to software applications that support customer-facing activities associated with a network, such as, but not limited to billing, order management, customer relationship management, and call centre automation.

Where 3G/4G networks relied upon network operators that owned the infrastructure that they relied upon, and typically provided service directly to subscribers associated with the UEs that connect to the infrastructure, next generation networks may have an architecture that permits the decoupling of roles in the network. A network operator (NO), or service provider (SP), not to be confused with a MVNO, may not directly own the entirety of the infrastructure that forms part of its network. Some the network resources, including access network resources, may be owned by an infrastructure provider or infrastructure owner. Access to these resources may not be exclusive, for example, more than one network operator may be provided access to the physical infrastructure of a set of so-called small cells within a building or set of buildings. In the context of billing, the infrastructure provider will need to be able to provide billing data to the NO in an agreed upon format, and on agreed upon terms (e.g. based on UE identifiers on a daily basis, or based on a categorization of type of UE on a weekly basis, etc. Each of these could be based on total amount of data consumed (or total uplink, or total downlink), or based on the number of transactions etc.) The NO may be providing access services for a Virtual Network Operation (VNO) that has the relationship with the subscriber. The NO may provide a network slice to the VNO containing the resources required to provide services to the subscribers. The NO can provide a VNO with a network slice within which the resources needed by the VNO can be instantiated The NO may also tailor the properties and attributes of the slice to the requirements of the VNO. The NO may also use slices to segregate traffic associated with different services. This can allow the NO to create network slices that satisfy the needs of each of the specific services. In one such example a slice can be created to serve the needs of a Machine Type Communication service which can support a large number of devices, each of which generates small messages at fixed intervals. Latency and reliability of the transport layer of this slice is likely less important than it would be in a slice that supports Ultra-Reliable Low Latency Communications (URLLC), although the URLLC slice would typically needs to support fewer devices.

VNs are operated by VN operators (VNOs), such as mobile VNOs (MVNOs). A VN is typically created on top of the resources of a NO (and in some examples may rely upon the resources of more than one NO). Reference to a customer should be understood to refer to the relationship between a VNO and the NO from which is receives a resource allocation.

Where conventional 3G/4G networks have addressed the collection of charging information by tracking data traffic associated with a UE at the Packet Gateway (PGW) and Serving Gateway (SGW). The placement of traffic monitoring functions at the gateways allows an NO or MVNO to determine, on a per UE basis, how much data traffic crossed the Radio Access Network (RAN) and Core Network. It should be understood that although the following discussion makes use of terms such as "charging" it could also be properly described as the collection of usage data. By focussing on the amount of data transmitted through gateway functions in a 3G/4G network, the ability of a NO to have a flexible charging system is greatly limited. Charging data is collected on a per-UE basis, and there is little incentive for an NO to implement mechanisms that effectively reduce the traffic generated by as UE. For example, in a scenario in which a plurality of devices are sending messages to the same server, a NO has little incentive to provide an aggregation function that could reduce the amount of traffic leaving its network. Embodiments of the present invention address the mechanism that can be used to collect charging data in mobile networks. Many of the discussions presented below will provide mechanisms for an NO to collect data. The collected data can be aggregated in different ways and either used by an accounting function in the OSS/BSS of the NO, or it can be provided to an MVNO.

To supplement the conventional charging data collection, embodiments of the present invention allow for the placement of monitoring functions at different locations of the network. The charging data collected by the monitoring functions can vary, so that one instance of a monitoring function can track the number of transactions, while another can track the volume of data. A single data flow associated with a UE may be monitored by more than one function. Services may be charged on a per-use basis (e.g. a per-transaction basis), based on traffic (e.g. a per-bit basis), etc. The collected charging data may also include information not used in 3G/4G networks. In addition to a time of day charging structure that is applied across a network, next generation networks may employ geographically differentiated charging. This may allow a network to charge more for data in a geographic region of the network that is particularly congested. To do this, the location of the UE, either in absolute terms, or in relation to the topology of the network would need to be included in the collected data. Furthermore, the time and traffic loads may need to be available to correlate to this charging record if not recorded in the charging data. If the UE location is based on a UE reported location, the placement of the monitoring function can be varied. If the location data is not based on, for example, a GPS location reported by the UE, then the placement of the charging function either at a base station/access node or at an anchor point serving a plurality of base stations can be used to collect this information. To facilitate charging customization, a charging data collection function (or a monitoring function) can be instantiated at a selected location in the core network in order to extract network activity information. This collected information can be provided to the OSS/BSS or to a customer for use in a given billing scenario. Charging can vary for example based on a geographic location of the network usage, traffic or congestion considerations, or time of day considerations, for example.

Embodiments of the present invention provide for a method and apparatus for generating and providing information associated with data usage or transactions associated with either a UE or a specified group of UEs. This collected information can be later used in charging and accounting operations. The charging data collection may enable the implementation of differential charging, for example in which customers are charged at rates that vary with respect to one or a combination of factors, such as geographic location, network traffic or congestion levels, and time (e.g., time of day).

The methods and apparatus may use a network interface designed for this purpose. The methods and apparatus may involve one or more of monitoring, accounting and charging functions which can be instantiated in the network and used to monitor usage of such services. For example, the functions can be instantiated at a base station, anchor point, or core network node or function, or a combination thereof. Data may also be contributed by a mobile device, in which case the mobile device may also include a charging data monitoring and generation function. The methods and apparatus can be used for collecting data associated with charging associated with access to services which can also be instantiated in a core network and monitored to collect data from different points in the data path. Aggregation functions can be used to reconcile and synchronize charging records from a plurality of independent monitoring functions.

According to an embodiment of the present invention, there is provided a method for charging a customer for use of a service offered inside the RAN and the core networks. The method includes instantiating one or more monitoring functions at one or more locations in the communication network associated with the particular service function. The locations can be selected for tracking one or both of: operations of service functions; and traffic flows in the network, corresponding to usage of the service. The monitoring functions can be configured to monitor traffic of transactions associated with these service functions. The monitoring function can be instantiated within the communication network at a location which is selected to allow monitoring or tracking of traffic flows associated with a UE even when the traffic flows terminate within the communication network instead of passing through the core network towards an Internet server. The method further includes collecting charging data based on the indications of the operations, the traffic flows within the network, or both. The monitoring function locations may be proximate to the service functions (e.g. located within the data center within which the service function is instantiated). The method may further include instantiating one or more customer service management functions configured to provide instructions to the monitoring function. This can allow differential types of data to be collected for different traffic flows for different UEs. The method may further include providing and using a database indicative of services being offered by one or more mobile network operators, one or more service providers, or a combination thereof.

In various embodiments, the monitoring function can be instantiated at a mobility anchor point associated with a UE. This can be performed in order to allow monitoring of traffic flows associated with the UE in accordance with a location of the UE, the location being with respect to a topology of the communications network.

According to another embodiment of the present invention, there is provided a method for providing a service to a customer via a communication network. The method includes providing, to the customer, information describing a service being offered. The method further includes receiving a service request from the customer. The method further includes verifying capacity of the communication network to provide the service. The method further includes providing the service according to a negotiated agreement. The method further includes monitoring usage of the service. The method further includes charging the customer or another party based on the monitored usage of the service.

Embodiments of the present invention provide a 5G network which includes monitoring and charging network architecture elements, and which is usable in customer charging operations.

Embodiments of the present invention relate to the impact of 5G network charging operations on a service descriptor, a network slice instance descriptor, and a network slice template.

Embodiments of the present invention relate to collection of charging data that may be used for a variety of operations for VN customers that make use of different charging for different use cases. The charging data may be collected by monitoring functions instantiated at different locations in the network. Different monitoring functions may track different charging data.

Embodiments of the present invention relate to collection of charging information for scenarios involving a virtual network (VN) customer. A virtual network is instantiated on the 5G network infrastructure for the VN customer, and charging is implemented for providing the virtual network, operating the virtual network, or both. Embodiments of the present invention provide methods and apparatus for charging the VN customer. Embodiments of the present invention provide methods and apparatus for supporting a VN customer in collecting charging information that allows for supporting different billing models than those that may be used with further customers of the VN customer, such as end users who use the VN. Embodiments of the present invention provide for customer charging data collection which can be dynamic in time, geographically varying, or both dynamic in time and geographically varying.

According to embodiments of the present invention, there is provided a method for collecting charging information associated with a customer for use of a service offered in a communication network. The method includes providing a virtual network for use by a virtual network (VN) operator. The virtual network is associated with one or more end-to-end service requirements, and the VN operator serves a plurality of end devices. The method further includes instantiating monitoring functions at one or more locations in the communication network. The locations are selected for one or both of: tracking operations of the virtual network; and to allow monitoring or tracking of traffic flows associated with a UE (using the service) and terminating within the communication network. The monitoring functions are configured to monitor said operations, or traffic flows, or both said operations and traffic flows of the virtual network and to provide indications of the operations, or traffic flows, or both the indications of the operations and traffic flows. The method further includes providing charging information for use in billing the customer based on the indications of the operations, or traffic flows, or both the indications of the operations and traffic flows.

In various embodiments, the customer is the VN operator, and the plurality of end devices are associated with the VN operator. The end devices may be owned by the VN operator or the end devices may belong to users who are affiliated with the VN operator or one of its clients. For example, the VN operator may be a company or organization and the users may be employees thereof.

In various embodiments, the customer is a customer of the VN operator, one or more of the plurality of end devices are associated with the customer, and the VN operator bills its customer based on the charging information associated with these end devices, collected by monitoring functions throughout the network.

In various embodiments, the virtual network is provided using a network slice. A service level agreement may be associated with the network slice, and a single service may be provided via the network slice according to the service level agreement. In other embodiments, a plurality of service level agreements are associated with the network slice, and one or more respective services are provided via the network slice according to each of the plurality of service level agreements. In other embodiments, a service level agreement is associated with the network slice, and a plurality of services are provided via the network slice according to the service level agreement. The conditions within the service level agreement(s) (SLA(s)) can be used to define or determine where monitoring functions to collect charging data are to be placed, and what data is to be collected for each service (or for different data flows within the service) at each monitoring function. It should be noted that monitoring functions may alternatively be referred to as charging data collection functions.

In some embodiments, the end-to-end service requirements associated with a service are defined by a service level agreement. The SLA may indicate requirements for providing service through the network, and may optionally include reference to levels of service provided to the end devices. The service level agreement may specify penalties incurred for failing to meet the requirements. The requirements may include one or more of: per-session requirements; per-user requirements; and per VN customer requirements. To allow enforcement of the requirements within an SLA, the charging data that is collected can be defined at least in part by the SLA requirements.

In some embodiments, charging rates for billing of the customer vary between different predetermined geographical regions, or charging rates for billing of the customer vary between different predetermined time periods, or both. Accordingly, the collection of charging data may vary by geographic region, and the placement of functions may be determined by these varying rates.

In some embodiments, the service is provided according to a service level agreement, the virtual network accommodates a plurality of traffic types, and the service level agreement specifies separate service levels for each of the plurality of traffic types.

In some embodiments, the service is provided according to a service level agreement, the virtual network accommodates a plurality of traffic types, and the service level agreement specifies an aggregate service level across the plurality of traffic types.

In some embodiments, the service is provided according to a service level agreement and the method further includes detecting excess service traffic above a level specified in the service level agreement. The method then further includes either: limiting said excess service traffic; or charging a premium for accommodating said excess service traffic. A customer-controlled traffic alert response function may then be alerted of the excess service traffic.

In some embodiments, the method further includes monitoring, by one of the monitoring functions, usage of a specified network resource allocated to a network slice holding the virtual network. The method may then further include one or more of prioritizing, filtering and policing traffic across the specified network resource according to customer-controlled instructions. The method may further include identifying traffic variations and resource utilization in the network slice. The method may also further include adjusting, using a customer-controlled function, traffic prioritizations in one or more network segments, or in one or more of the plurality of end devices based on the identified traffic variations and resource utilization, or both. In some embodiments, the method may also further include adjusting operation of resource assignment functions in the network based on the identified traffic variations and resource utilization. In some embodiments, the method may also further include advising a user of at least one of the end devices to switch off the at least one of the end devices, enable or disable specified applications running on at least one of the end devices, change priority settings on the at least one of the end devices, or a combination of the above. In some embodiments, the virtual network is provided using a network slice, a service level agreement is associated with the network slice, and the method also further includes adjusting the service level agreement based on the identified traffic variations and resource utilization.

In some embodiments, the monitored operations of the virtual network include one or both of: usage of resources allocated to support the virtual network; and operations of the end devices using the resources. In this case, the method may further include identifying, based on the monitored operations, a type of traffic passing through a congested portion of the virtual network, and prompting the customer to control said identified type of traffic.

In some embodiments, charging rates for billing of the customer vary based on current network congestion levels or current competitive demand for network resources. Additionally or alternatively, charging rates for billing of the customer can be set using bargaining or auctioning.

Various charging principles for use in embodiments of the present invention in relation to 5G networks may be defined as follows.

In some embodiments, the entity being charged is a VN customer, an entity using a VN service, or an individual end user. Accordingly, charging data that is collected by a monitoring function can vary based on requirements defined by operational processes and agreements. This data may also be aggregated in different ways based on these requirements.

In some embodiments, penalties may be described in a service level agreement (SLA) and invoked when an operator fails to meet certain key performance indicators (KPIs), such as one or more of network slice-level KPIs, VN service-level KPIs, and individual user KPIs.

In some embodiments, charging data collection/monitoring functions may be provided that are specific to a service, or a network slice, or both a service and network slice. Different charging methods may be used for different user groups.

In some embodiments, collection of individual end user charging data may be provided to a VN customer in raw or aggregated fashions. To provide this charging support, the VN customer may be provided with access to a customer-specific charging data collection function which provides data for use by the VN customer in charging its end users. The mobile network operator (MNO) is not necessarily aware of the charging method being used by the VN customer.

In various embodiments, charging data may be collected to contain information associated with one or more of: usage of a bandwidth resource of the communication network; usage of a network-based resource; the number of transactions carried out; and usage of a specific service function provided in the network.

In some implementations, charges levied by a NO on a VNO (or by a VNO on the subscribers) for using an access network may differ from charges levied for using a backhaul network. Accordingly, the manner in which the data is collected, including the location at which the data is monitored for collection, and the information recorded during the collection, may vary. In various embodiments, charges levied for using an access network, or a backhaul network, or both an access network and backhaul network may differ based on geographic location at which the usage occurs. This may be the geographic location of the end mobile device receiving data according to the service, for example. For differential geographic access charges, the charging data collection function can be placed at a base station, or at an anchor point associated with a set of base stations. This allows for definitive attribution of traffic in congested areas. In another embodiment, the charging function can be implemented at other locations, and UE specific location information (such as geographic location information provided by a UE-based function) can be recorded.

In various embodiments, particular charges may be levied for providing cached or stored, pre-fetched content. Charges levied for providing cached content may differ from charges levied for providing non-cached content, for example on a cost-per-byte basis. Because requests for data that are served out of a caching function in the network would not register as traffic leaving the core network, requests served out of the caching functions may not be properly attributable in a 3G/4G network. As noted above, by placing charging data collection functions to monitor access to cache data, charging data can be collected and either associated with the UE making the request, or with a content owner depending on the nature of the billing information.

In various embodiments, charges levied may differ based on service type. For example, charges may differ based on characteristics of data provided according to the service, such as QoS, reliability, bit rate delay guarantees, etc.

In various embodiments, charges may be levied for reserving a resource according to the service, whether or not the resource is used.

In various embodiments, the charging policy is negotiable between a customer, such as a VN customer, and network operators. The charging policy may be negotiable for example with respect to bit volume, communication delay parameters, service reliability, or a combination thereof.

In some embodiments, charging rules may vary dynamically over time, and may be updated for example based on network load, network resource availability, or a combination thereof.

In some embodiments, charging rules may vary based on location(s) of end user device(s) User-In-the-Loop (UIL) considerations, or both.

In some embodiments, the collection of charging data is performed so that a service level agreement (SLA) model can be enforced for both parties. In the SLA model, pricing and charging rules are agreed upon. A customer service management (CSM) database can be used to indicate to charging data collection functions which data collection should be performed. A CSM can configure the location of a per-service CSM charging control element based on the manner in which the charging rules are applied.

In some embodiments, collection of charging data follows a per-pay-per-service model. In this model, the service price (charging rate) and charging rule are created based on negotiation between the CSM and a customer. Information indicative of charging rates can be indicated to the designated payment entity or another party.

In various embodiments, charging data collection is included as one of several functionalities of automated customer service management, as provided within a mobile communication core network. The collection of charging data functionality can be integrated with various other functionalities of the CSM. Such other functionalities can include, but are not necessarily limited to collecting of charging data in accordance with: service negotiation and SLA creation; ensuring/validating Quality of Experience (QoE)/Quality of Service (QoS) satisfaction; network functions used for caching and other services; policy control; resource assignment; user context handling; monitoring and feedback mechanisms; and customer billing.

The above functionalities can be provided using functions instantiated in the network, for example using network function virtualization. Such functions can be specific to a network slice. Such functions can alternatively be common functions located in at least one of a core network (CN) and a radio access network (RAN), and can serve multiple network slices. A slice-specific function can be indicated herein using the prefix "S", e.g. as in S-CSM. A common function (e.g. a function associated with a plurality of different slices, or a function that can be used to serve a plurality of different slices) can be indicated using the prefix "C", e.g. as in C-CSM.

Figure 2A:
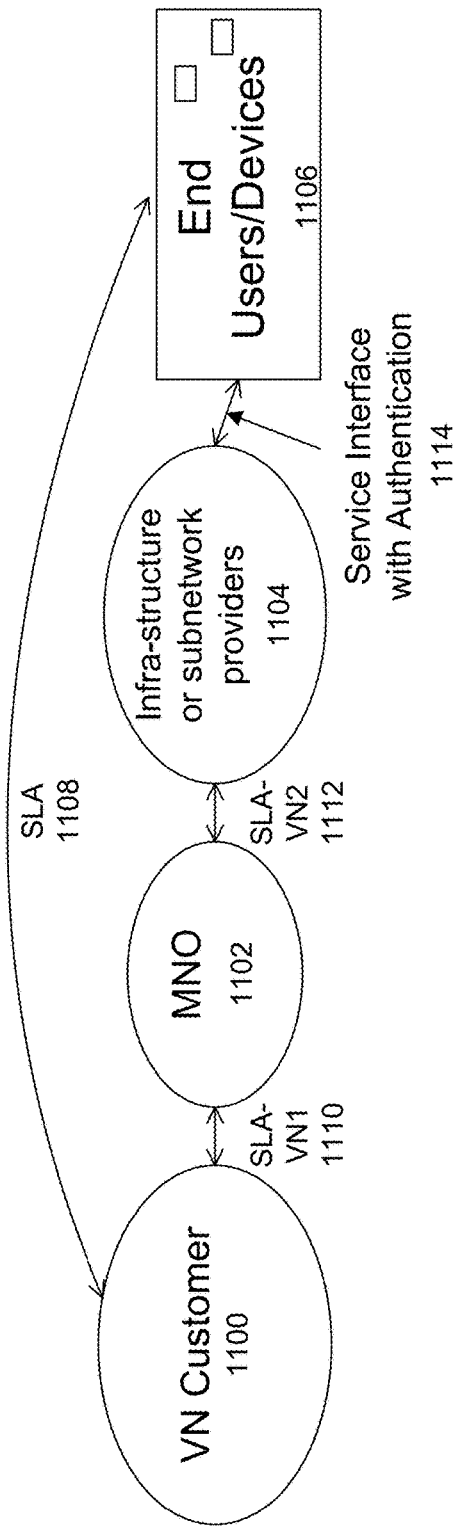
FIG. 2A schematically illustrates interacting entities according to embodiments of the charging and monitoring method and apparatus of the present invention.

FIG. 2A illustrates interacting entities according to embodiments of the charging and monitoring method and apparatus of the present invention, for example in order to depict an operational model thereof. As illustrated in FIG. 2A, each entity interaction may incorporate an SLA to be followed for charging of the respective entities. For example, as illustrated in FIG. 2A, a VN Customer 1100 (such as a VNO that is a customer of the MNO 1102) can have its VN created using the network resources of an MNO 1102. The MNO 1102 can perform charging data collection so that usage of resources of both the MNO 1102 and the infrastructure provider(s) 1104, can be attributed to the VN Customer 1100. The collection of charging data for will follow the SLA, referred to as SLA-VN1 1110, between MNO 1100 and VN Customer 1102. In addition, the VN Customer 1100 can interact directly with end devices 1106, with charging following another SLA 1108. The data collected by MNO 1102 and provided to VN Customer 1100 should be sufficiently detailed to allow the VN Customer 1100 to be able to satisfy the SLA 1108. The MNO 1102 can also interact with infra-structure and/or subnetwork providers 1104. The charging function between these entity types can be governed by SLA-VN2 1112. The infra-structure and/or subnetwork providers 1104, in turn, can interact directly with the end devices 1106. From the perspective of the end user, there is a relationship with VN Customer 1100 and the interactions with the infrastructure providers and MNO are transparent. Charging between these entities may proceed via a Service Interface 1114 with authentication requirements. The charging rules which have been agreed to will govern where and how charging data is collected, and how it is provided. When one entity provides service to another, the service can be provided according to a temporary or ongoing service level agreement. An entity can use its own resources in providing a service or to acquire and re-sell usage of others' resources, or a combination thereof.

Figure 2B:
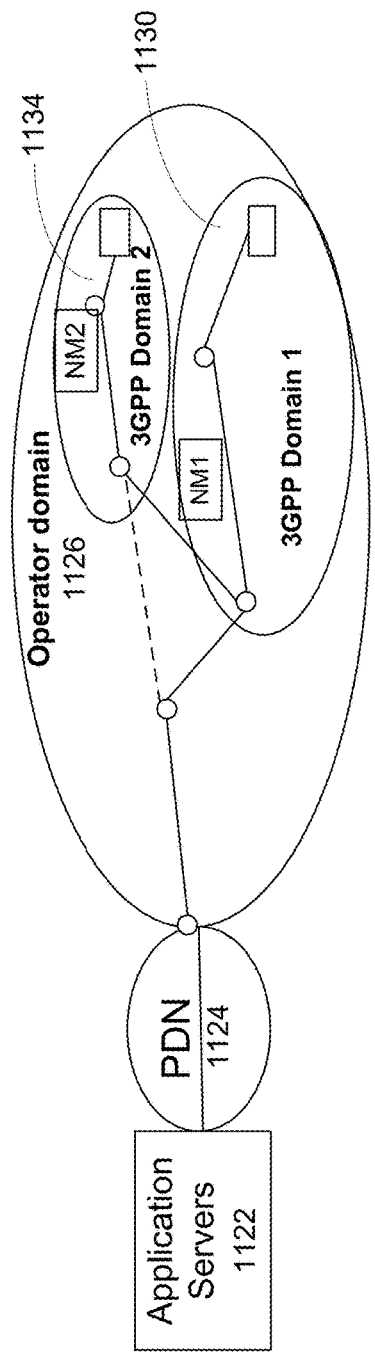
FIG. 2B schematically illustrates further interactions associated with FIG. 2A.

FIG. 2B illustrates a physical network layout which may be used to support the interaction of FIG. 2A. The layout includes application servers 1122 which are coupled to an operator domain 1126 via a packet data network 1124. The application servers may belong to the VN customer 1100, for example. The operator domain may belong to and be operated by the MNO 1102. One or more sub-domains 1130, 1134 are illustrated. At least one of these sub-domains 1130, 1134 may be operated by the infra-structure and/or subnetwork provider 1104. The sub-domains may be 3GPP domains, for example. The end devices 1106 can communicate with elements of the sub-domains 1130, 1134.

Figure 3:
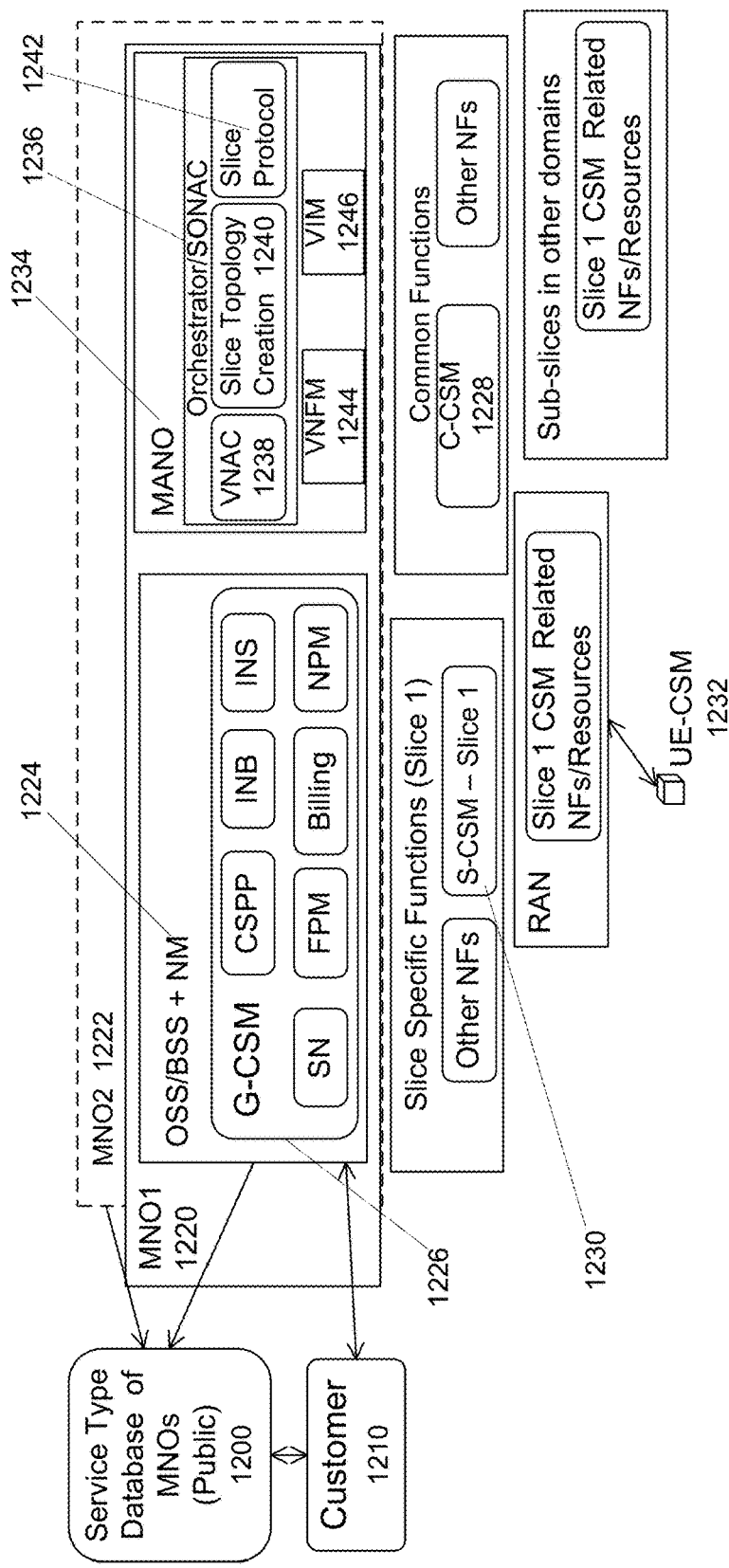
FIG. 3 is a block diagram illustrating components of a charging and monitoring system according to an embodiment of the present invention.

FIG. 3 is a block diagram illustrating a charging and customer service functional architecture according to one embodiment. As illustrated in FIG. 3, according to this embodiment, the system includes a public service provider information database 1200 listing MNOs. The database 1200 communicates with, and stores details relating to, at least one MNO and can be accessed by a customer 1210. In the example depicted in FIG. 3, the database 1200 includes details relating to at least a first MNO (MNO1) 1220 and a second MNO (MNO2) 1222. The database 1200 can include a listing of available services and service types, and associated parameters such as customer charging details, charging capabilities, available customization, etc.

The architecture includes different types of CSM functions. For example, MNO1 1220 includes a Global CSM (G-CSM) 1226, which functions as a component within the OSS/BSS+network management (NM) system 1224, and works on management functions common to all the slices/services of the MNO1 1220. MNO1 1220 further includes Management and Orchestration (MANO) entity 1234, which comprises Orchestrator/SONAC 1236. As used herein, "SONAC" refers to a Service Oriented Network Auto Creation technology, which can be implemented as a set of network control functions or a software controller. In various embodiments, such as illustrated in FIG. 3, SONAC includes enabling technologies, such as Virtual Network Admission Controller (VNAC) 1238, Slice Topology Creation 1240, Slice Protocol function 1242, Virtual Network Function Manager (VNFM) 1244 and Virtual Infra-structure Manager (VIM) 1246. In embodiments where the network makes use of virtualization, such as is depicted in FIG. 3, some of these SONAC functions may reside in an orchestrator. In some embodiments, SONAC may alternatively be described as a Network Function Virtualization Management and Orchestration entity.

The charging and customer service functional architecture may additionally include Common CSM (C-CSM) 1228 functions in the control or user plane, which may be common to all the services/slices. Service/slice specific CSM functions (S-CSM), such as S-CSM—Slice 1 functions 1230 are specific to a single slice. A CSM function operating on the UE, labelled UE-CSM 1232 may be provided, for example in order to allow a UE, or user or owner thereof to interact with other CSM components in the network.

Figure 4:
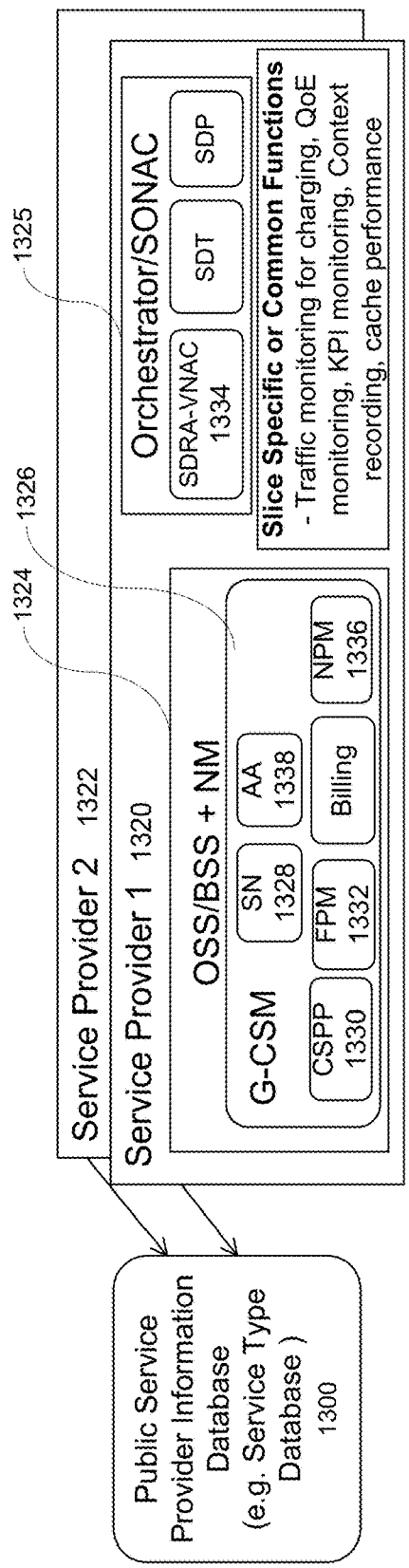
FIG. 4 is a block diagram illustrating components of a charging and monitoring system according to an embodiment of the present invention.

FIG. 4 is a block diagram of components within the architecture illustrated in FIG. 3, illustrating one embodiment of a system for customer charging operations, and the collection of the charging data.

Referring to FIG. 4, the Public Service Provider Information database 1300 maintains a listing of the offered service types of the service providers and associated policies and negotiation steps. The database 1300 further stores details associated with various charging methods. The details may include information about how the charging data is to be collected, and where the monitoring functions are to be instantiated. In the example illustrated in FIG. 4, the database maintains this information for at least Service Provider 1 1320 and Service Provider 2 1322.

Service Provider 1 1320, can include the following functionalities within the OSS/BSS+NM 1324 and the Orchestrator/SONAC 1325:

G-CSM (Global Customer Service Manager) 1326 consists of several CSM functions responsible for all the interactions with the customer during establishment of a new customer service. G-CSM functions may include preparation of the SLA, interaction with the orchestrator to obtain optimum solutions, network monitoring, SLA adjustments, and billing.

SN (Service Negotiator) 1328 is responsible for negotiation with a customer while obtaining capability assessment from VNAC and financial policies from FM.

CSPP (Customer Service Profiles and Policies) 1330 includes the service profiles of different (e.g. all) types offered by the network, and stores the SLA details including policy aspects once a service is admitted.

FPM (Financial Policy Manager) 1332 keeps the financial guidelines for business creation, optimization aspects for profitability and pricing, or both, and may account for market situations and competition.

VNAC (Virtual Network Admission Control) 1334 assesses whether a service request can be accommodated, and assesses the associated resource cost. VNAC also indicates negotiation options (e.g., if extra resources are required).

NPM (Network Performance Monitor) 1336 stores the performance history of the network dynamically updated by the service instance monitoring functions. This is used to calculate the charges including penalties and to re-negotiate SLAs.

AA (Authentication and Authorization) 1338 negotiates the AA methods with the customer and stores customer device and service AA information as appropriate. The AA methods may depend on the charging method.

NM (Network management) configures and manages the network slices and related functions, resources and databases required for the service.

Figure 5:
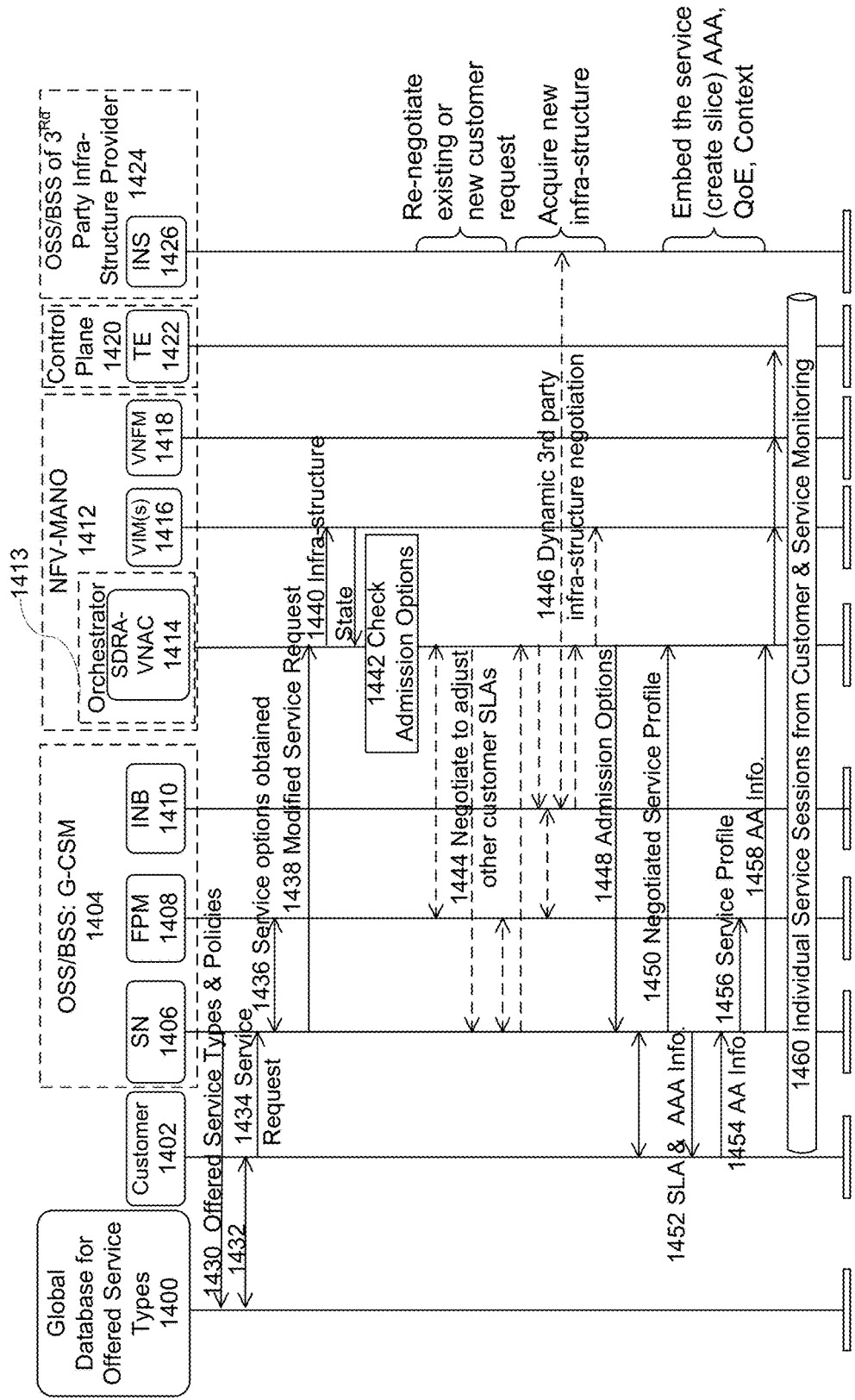
FIG. 5 is a signalling diagram illustrating a charging and monitoring procedure according to an embodiment of the present invention.

FIG. 5 is a signalling diagram illustrating steps of a procedure for 5G VN service provisioning and charging data collection. Operations illustrated in FIG. 5 are described below.

The first illustrated step 1430 is preparation of a public database 1400 for services offered by the network. During this step 1430 the G-CSM 1404 updates all the service types the operator can offer with the policies, coverage areas, traffic input methods, and charging methods, for public view. In one example, the public database 1430 is a database comprising information related to multiple network operators. The information may be made accessible to customers and potential customers.

In step 1432 the customer 1402 (or a representative device such as a UE or computer automatically operating on behalf thereof) makes a service request by reaching the database 1400 and attempting to find a matching service offer(s), following which, at step 1434, the customer (or representative device) makes a service request to interested network operator's Service Negotiator (SN) 1406 in the G-CSM 1404.

In step 1436 the service request is communicated to FPM 1408 and service options are obtained by the SN 1406 from FPM 1408 to generate a modified service request.

In step 1438 the modified service request is communicated to the SDRA-VNAC 1414 of the orchestrator 1413 of NFV-MANO 1412. In the next step 1440 the infra-structure state is communicated between the SDRA-VNAC 1414 and the VIM(s) 1416 within NFV-MANO 1412. SDRA refers to Software Defined Resource Allocation. NFV refers to network function virtualization.

In step 1442 the SDRA-VNAC 1414 checks admission options. During this step a series of communications may be performed to re-negotiate existing SLAs or create new SLAs in response to the customer request. Optionally, in step 1444, SDRA-VNAC 1414 and SN 1406 negotiate to adjust other customer SLAs during step 1442. In optional step 1446 the infrastructure buyer (INB) 1410 of G-CSM 1404 communicates with the infrastructure seller (INS) 1426 of OSS/BSS 1424 of a 3$^{rd}$ Party Infra-structure provider to acquire a new infra-structure. It should be understood that the buying and selling of infrastructure should be understood to include the purchase or sale of access rights to infrastructure, and may not involve the actual purchase and sale of the physical infrastructure.

In step 1448 the SDRA-VNAC 1414 communicates the admission options to the SN 1406, following which, in step 1449 the SN 1406 communicates the options to the customer 1402.

In step 1450 SN 1406 communicates the negotiated service profile to the SDRA-VNAC 1414, and in step 1452, SN 1406 communicates the SLA and AAA (Authentication, Authorization and Accounting) information to the customer. In return, in step 1454, the customer (or representative device) 1402 returns the AA information to the SN 1406. Then the SN 1406, in step 1456, communicates the service profile to the FPM 1408 and, in step 1458, the SN 1406 communicates the AA information to the SDRA-VNAC 1414, which then forwards the information to the VIMs 1416, which forwards the information to the VNFM 1418. The VNFM 1418 then forwards the information to the traffic engineering (TE) entity 1422 in the control plane 1420 of the system. During these steps the service AAA, QoE and context is embedded (e.g., a slice is created).

In step 1460, the individual service sessions from Customer and Service Monitoring proceed. The customer is provided with the service and the service quality and other metrics related to the SLA can be monitored.

Continuing now with a more general description of certain aspects of FIG. 5, in some embodiments, after the service request, the network negotiates the service provision. The G-CSM compares the service profiles and policies stored in the CSPP and if the G-CSM does not find a match with a service profile or several service profiles, it will either reject the request or re-negotiate a matching profile. If it finds a match, the request will be sent to the VNAC in the network design unit to check the admissibility or to provide options for further negotiation.

In some embodiments, after negotiation of the service provision, the VNAC checks admissibility, designs the best viable network solutions and informs the FPM in the G-CSM. The solutions may include, but are not limited to:

obtaining additional resources, in which the SN sends a request to the INB for the resources needed and if it can negotiate with an InP with the acceptable (profitable) price accepts the new call; and reducing the requirements of existing services or the new request, in which the SN checks the best option out of the VNAC list and renegotiates with an existing customer or the new customer (or representative device thereof).

In some embodiments, the FPM jointly optimizes financial solution(s) with the viable network design options and the SN negotiates with the customer providing different options. If an agreement is reached, the SLA is established (or renegotiated as the case may be). The SLA can include, for example: how to perform AAA with the network operator (SN); required AAA information (e.g., device ID database, keys, capabilities, service types and priorities assigned to different devices); service policies and KPIs; charging policies with required geographic and time interval definitions, and optionally where and how the charging data is to be collected.

In some embodiments, the MNO subsequently saves the SLA and informs the Network Design unit to create a service instance for this service. The MNO may define the customer service instance descriptor (CSID) and also choose a slice for the service and create or modify the network slice descriptor (NSLD) of the slice.

The CSID and NSLD include indications of methods usable to monitor traffic at different locations and other mechanisms to support above options as appropriate (e.g., traffic filtering methods, session admission control (AC)). The CSID and NSLD may be indicative of operation of functions used for said monitoring usage of the service. The methods may be per-service based, per-user based, or per-session based. Accounting and other policies are maintained in the Global CSM-Charging (G-CSM-Charging) function. The policies may include traffic controlling or policing policies used to handle traffic/resource overload from end users/devices. The G-CSM decides the locations of CSM charging control and monitoring elements (e.g., types of data to log, bits, BW, location, etc.). The network management system (NMS) configures those charging related network functions, data forwarding and access resource assignment for QoS/QoE enforcement to network nodes and elements. The NMS also prepares a feedback mechanism for the QoS violations (e.g., triggering thresholds). The NMS can indicate charging changes in the case of dynamic charging, or provide special charging related messages for service traffic control or for receipt by the customer, or both. The NMS can also provide indications of customer service plan changes and changes to the above-described configurations to the accounting nodes.

Certain customers may have multiple service instances using the same slice instance. In one example, individual service instances are charged separately. In another example, charging is for use of the slice by aggregate services (e.g., prioritization, controlling admission of sessions or controlling generation of certain traffic types). The SLA may be customized to such situations.

In various embodiments, during operation (e.g. from time to time) or after completion of sessions or services, monitored information can be transmitted to the CSM. The CSM can compare actual performance profiles, determined based on the monitored information, with promised performance, which was previously agreed upon during service negotiation or acceptance of a SLA. The comparison can be used to prepare charging data, bills or invoices, or account debiting or crediting information. For example, if delivered performance does not meet promised performance, an agreed-upon discount may be applied.

The method and apparatus as described herein may be used to support different VN service types. In one embodiment, the service type is an on-demand connectivity service provided in response to a direct end user request from an MNO. In this example, charging may be based on on-demand connectivity for a single session (which may include multiple devices) with no SLA. The single session may be provided directly to end users. An example of this type of service is a video conference for a one time session, with on-demand charging, reverse charging (to a third party), or free (no charge) basic service.

In another embodiment, charging is performed for a Virtual Network with end-to-end (e2e) service requirements for a VN customer having its own user/device population. In this case, the SLA may cover traffic demand distributed in different geographical bins/regions and specific times. This may be applicable to a single user with a SLA or VN customer with a SLA (its own service department can be considered as a VN customer). The following are three examples of a VN with e2e service requirements:

B1 A VN having a single network slice, a single SLA, and providing a single vertical service;

B2 A VN having a single network slice, and multiple SLAs (e.g. for same application type (alarm services, video delivery services)), and providing one or multiple services;

B3 A VN having a single network slice, and a single SLA for multiple application types (e.g. having different QoE requirements) as a single aggregated service (e.g., multiple service instances for the virtual network slice with aggregate traffic cap). This may be applicable to an MVNO or a partner service provider.

In another embodiment the VN service is a VN with a specific topology. The VN has specific link/node capabilities (e.g., network, segment/sub-slice) and is provided either: (a) with control; or (b) without control. Such control may refer for example to resource, link, routing or scheduling control, or a combination thereof.

In another embodiment, the VN service belongs to an asset provider having specific resources (e.g., links, nodes, storage) or specific functions (e.g., virtual network function as a service (VNFaaS)). The VN service may be provided either: (a) with full controlling capability; or (b) without full controlling capability.

In another embodiment, the VN service is a special service, such as but not necessarily limited to a caching service, data pre-fetching service, or data analytics as a service (DaaS) service. In this case, related network functions may be instantiated using dedicated slices, or the related network functions may be instantiated in existing slices, with the cooperation of slice owners. For example, for a data analytics VN service, specific user or network information, or data analytics, may be provided to third parties (with consent of the network/end users).

There are at least three different types of customers that can be charged according to various embodiments. As such there are different locations for and types of data collection provided by embodiments of the present system and method. One type of customer is a VN customer. A second type of customer is an end user of an MNO's own VN service. The second type of customer may exist for example in the case that the MNO has its own MTC service or video distribution service which is available to customers thereof. As described in more detail below, the charging methods used for the VN customers is applicable to this case if the MNOs own application/service-providing department is its customer. A third customer type is a customer, such as an individual end user or owner of a single UE, initiating on-demand end user sessions.

Figure 6:
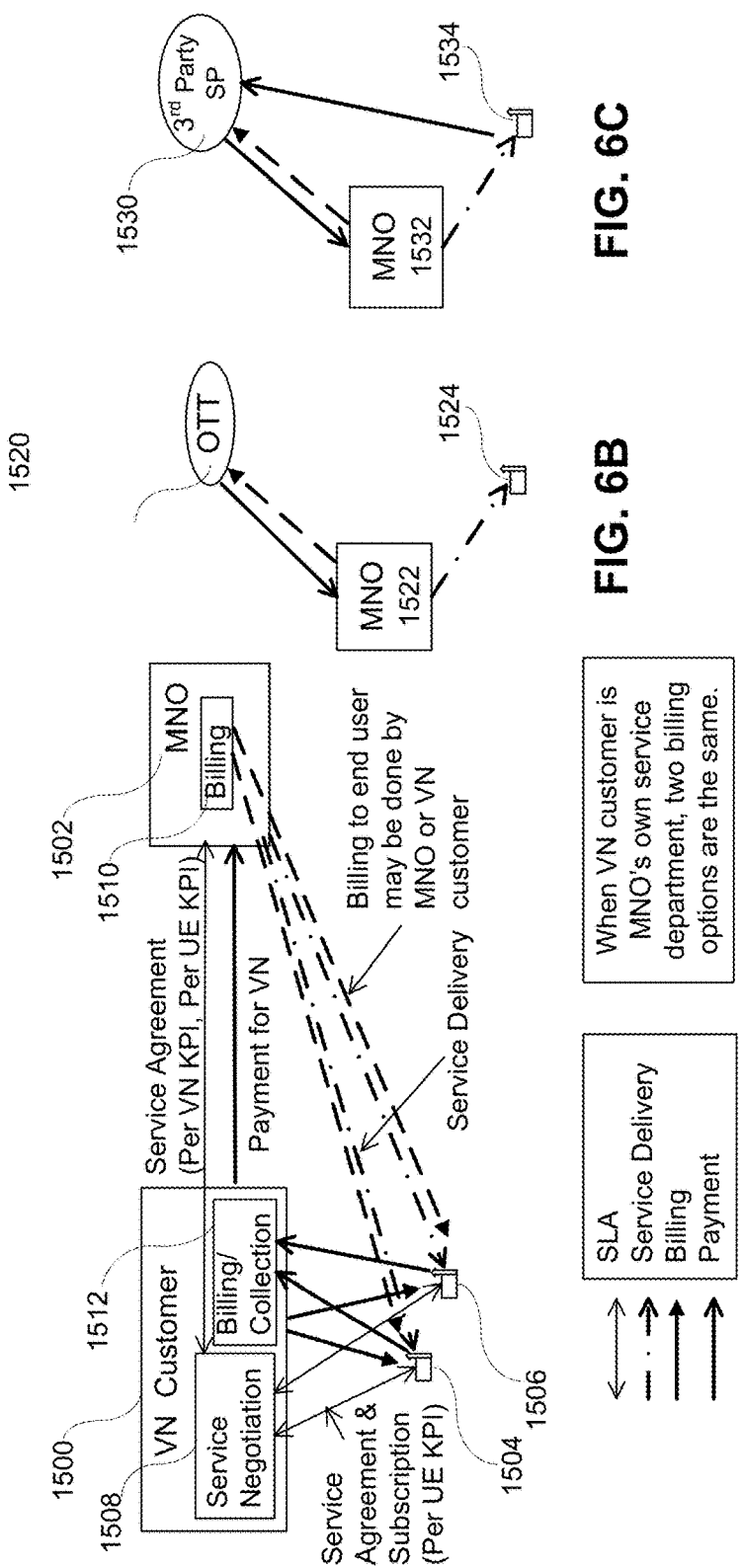
FIG. 6A is a block diagram illustrating an embodiment of a system for VN customer charging.
FIG. 6B is a block diagram illustrating an embodiment of a reverse charging system for on-demand session charging.
FIG. 6C is a block diagram illustrating an embodiment of an on-demand session charging system that includes $3^{rd}$ party payment authorization.
FIG. 6D is a block diagram illustrating an embodiment of an on-demand session charging system that charging to an end user.

FIG. 6A illustrates an embodiment of a system architecture for VN customer charging. As illustrated in FIG. 6A, the VN customer 1500 may be the MNO 1502's own service department, however, this system may also be applicable to the embodiment in which the customer is a VN customer that is separate from the MNO. In the embodiment illustrated in FIG. 6A, end users 1504 and 1506 communicate with the SN 1508 of VN customer 1500 regarding SLA and subscription (including per UE KPIs). The SLA (per VN KPI and per UE KPI) is communicated between VN customer 1500 and MNO 1502. The MNO 1502 provides service delivery to end users 1504 and 1506. Either the billing entity 1510 of MNO 1502 or the billing/collection entity of the VN customer 1500 communicates with the end users 1504 and 1506 regarding billing. Payment is made from the end users 1504 and 1506 to the billing collection entity 1512 of the VN customer 1500.

FIGS. 6B-D illustrates examples of system architecture for on-demand session charging. As illustrated in FIG. 6B, the system architecture can support reverse charging in which an Over-the-top (OTT) entity 1520 delivers a service to an end user 1524 using an MNO 1522. In one embodiment, the service is generated using a function within the MNO. In this example, the MNO 1522 provides billing information to OTT entity 1520, which then provides payment to MNO 1522 for the service delivered to end user 1524.

FIG. 6C illustrates an example of on-demand session charging having $3^{rd}$ party payment authorization. In this example, the $3^{rd}$ party service provider 1530 delivers a service to the end user 1534 using the MNO 1532. Again, in one embodiment, the service is generated using a function within the MNO. Billing information is communicated from the MNO 1532 to the $3^{rd}$ party service provider 1530 and the $3^{rd}$ party service provider 1530 then provides payment to the MNO 1532 for the service delivered to end user 1534. The end user 1534 may provide payment to the service provider 1530.

FIG. 6D illustrates an example of on-demand session charging in which the charging is made directly to the end user 1544 from MNO 1542, which provides both the service delivery and the billing information to end user 1544.

The procedure for collecting charging data may vary based on the VN service provided, as described below.

In one embodiment, charging for the data consumed or for the transactions undertaken is directed to the VN Customer. As such, the data collection requirements can be configured to reflect this. This embodiment may be applicable, for example, for VN customers with specific e2e service requirements, VN customers requiring a specific topology, and for charging VN customers operating as asset providers.

In one example of this embodiment, charging may be based on a contract for a fixed demand. The contract may specify KPIs or may involve capability guarantee-based charging, or both. The contract may include penalties for not meeting performance guarantees and may specify different charging methodologies for different geographical areas and time intervals. The collection of charging data to satisfy these requirements would thus include information representative of the defined KPI requirements. Certain resources may be specified for different charging methodologies. In this example, the SLA may be a long-term SLA but the KPI may be for shorter-term or other-term temporal/geographical windows. For example, the contract may specify a monthly payment agreement for full VN service.

In another example, charging is resource reservation based. This approach may be used for charging for the use of network slices established using hard slicing or for charging based on the amount of resources reserved, or both. Such charging may include penalties for not meeting a promised service requirement. This charging approach may also be applied for providing infra-structure as a service. As a result, the collected charging information might reflect the number of transactions that were satisfied vs. the number of transactions rejected. Alternatively the collected charging data may reflect the volume of data processed in the accepted transactions and the number of rejected transactions.

In another example, charging to a VN customer is usage based charging. For example, a first charge may be levied for access network usage and a second, possibly different charge may be levied for core network usage. Charging may be pay as you go charging, for example. Usage-based charging may be based for example on amount of generated traffic (e.g. number of sessions, bit volume) or based on an amount of resources used for serving the VN customer. The charging data collected would thus be usage based, but it could be reported to the VN customer on a very short reporting cycle so that the VN customer can accurately determine the data usage. The collected data could also reflect the time and location of the data connection along with network usage statistics to enable congestion based billing.

In a further example of charging to a VN customer, a dynamic charging procedure (in which charging rules vary over time, geography, or both) is used. In this example, charging may be based for example on one or more of: network demand, network load, competitive state, bidding for services, location, or UIL.

In another embodiment, charging is made to the end user. This embodiment may be applicable for, for example, on-demand connectivity services, VNs with e2e service requirements, and VNs with a specific topology.

In this embodiment, charging performed may be according to end user service, with billing to the end user directly by MNO and payment obtained from a VN customer. Charging may be performed according to end user service and charged to a VN customer (e.g. in a sub-contract situation). Charging may also be performed by reverse charging the end user (e.g. although charging data is associated with the UE, the charging record is attributed to the content provider instead of the UE).

In one example of charging according to end user service, charging may be for free (to the end user) access to certain servers (e.g., for access to an OTT service provider such as Amazon®). The usage records associated with this usage can be prevented from being attributed to the user. In another example, the charging is performed using a dynamic charging procedure, which may be, for example, demand/load based, competitive state, bidding, location, or UIL based. In such cases the collected data may include load and location information and may optionally include information indicative of user agreement through UIL processes.

In another embodiment, charging is levied for special services (e.g., caching, pre-fetching, DaaS). In this embodiment, charging data may be collected for use of special functions used for the service, for caching or pre-fetching services, or for tracking or providing user context and data analytics.

The charging data collection procedures as described herein may include generic traffic monitoring at different points in the network, along with an aggregation and reconciliation to create a unified traffic monitoring report. The procedures may vary based on, for example, one or more of: what statistics are to be collected, what granularity is required, and the management methods used to guarantee QoS.

Usage/traffic statistics collected may include: bit volume; resource usage; number of sessions; geographical information (such as user location, node location; with, for example, hot spots in network usage, remote areas, and different node types charging differently); and time information. There may be different data collected at different locations in the network, with reconciliation performed by a further aggregation function.

Usage/traffic statistics may be collected with different granularity in different embodiments. In one embodiment, for individual session charging, only bit volume, number of sessions, and geographic information may be used. For other service types, monitoring may be done for the network optimization, admission control, to change demand based charging parameters, etc. Usage/traffic statistics may be, for example one or more of: flow based; session based; UE based (when multiple sessions from same user); service instance based; service type based; slice instance based; slice type based; and aggregated per QoS based.

The method and apparatus for collecting charging data that can be provided for use in customer charging operations as described herein can comprise generic QoE/QoS management methods, monitoring and accounting. The methods may vary depending on SLA parameters.

In one embodiment, the SLA includes a KPI guarantee parameter for a provided e2e VN service/slice. The KPI guarantee may be per geographical bin or/and time or/and user category. The KPI guarantee may indicate, for example one or more of: percent of users in a service outage condition, percent of users in a service satisfaction condition; percent area for a given QoE/outage statistic; percent blocking for a specific demand; and percent dropping for a specific demand. The KPI guarantee may specify minimum performance levels for such parameters. Percent area for a given QoE/outage statistic may refer to the percentage of area, of a total serviced geographic area, that satisfies the given statistic. Percent blocking and dropping may refer to the percentage of service requests blocked and the percentage of packets or service sessions with end users dropped, respectively.

In one example of this embodiment, monitoring data flows and connections to ensure that one or more KPIs for the service can be satisfied may be performed at locations corresponding to different geographical bins, for one or more specific user categories, etc. The collected data can be used by both charging processes, and by slice operations managers (SOM) which may be responsible for adjusting resource allocation to satisfy the KPIs. Charging processes may relate to both the MNO charging the VNO and the VNO charging the end users. According to a predetermined policy, a SOM may take an action, such as policing traffic or blocking further sessions from using the same VN or associated network slice. The action may be based on one or more of: geographic, time, and priority criteria. The action may involve contacting the VN customer for instructions.

In various embodiments, if penalties are specified in the SLA to address variability, then when KPIs are close to violation levels, the MNO may examine the available resources to determine if resource allocations should be modified. As part of an optimization process, it may be decided that resources will not be re-allocated, because the cost of reallocation exceeds any penalties. Monitoring, policing, blocking, etc. points may be determined for different measurements, to reflect the geographical areas and different networks/subnetworks. Such details may be determined by the SOM during creation. If multiple services are served by a single slice, service-specific data collection, policing and session blocking may be performed by identifying service traffic.

In another embodiment, the SLA includes end-to-end per-UE KPI parameters (e.g., aggregated data rate statistics for a UE for a given time interval, per geographic bin (Gbin) or other defined geographic area, peak rate, latency, mobility dependent KPIs). If a per user KPI drops, the SOM is notified. The SOM may obtain other UE statistics in the same area and attempt to provide priority service to the user (over other users) if possible, and subject to fairness and policing considerations. The SOM may instruct subnetworks and nodes to act according to such attempts. These statistics may be based on the collected charging data.

According to some embodiments, per-UE traffic is identified at selected nodes. Further dynamic priority adjustment can be performed to address fairness as per SLA (e.g. scheduler) and charging and penalty policies. The method and apparatus may have the ability to undergo configuration changes to facilitate the above. The VN customer may be allowed to make a decision. Further, there may be extra charges for closed-loop QoE management services if these are implemented.

In another embodiment, the SLA includes an end-to-end per-session QoE parameter. If a per-session KPI drops, the SOM is notified. SOM obtains other session statistics in the same area and tries to provide priority if possible, and subject to fairness and policing considerations. SOM may instruct subnetworks and nodes accordingly.

The method and apparatus according to this embodiment may utilize per-session based identification and fairness across sessions for each subnetwork. As in the previous embodiments, the VN customer may be allowed to make a decision.

In another embodiment, the SLA includes an end-to-end per-flow QoS parameter. If a per-flow KPI drops, the SOM is notified. The SOM obtains other flow statistics in the same area and attempts to provide prioritization if possible, and subject to fairness and policing considerations. The SOM may instruct subnetworks and nodes accordingly. In this case, impacts to session and per-UE traffic may be assessed.

The method and apparatus according to this embodiment may use per-flow based identification for a given session. Applications, customers, or both, may also be consulted or allowed to control traffic. Customers may request additional resources or higher KPIs with higher charging, to address overloading.

Figure 7:
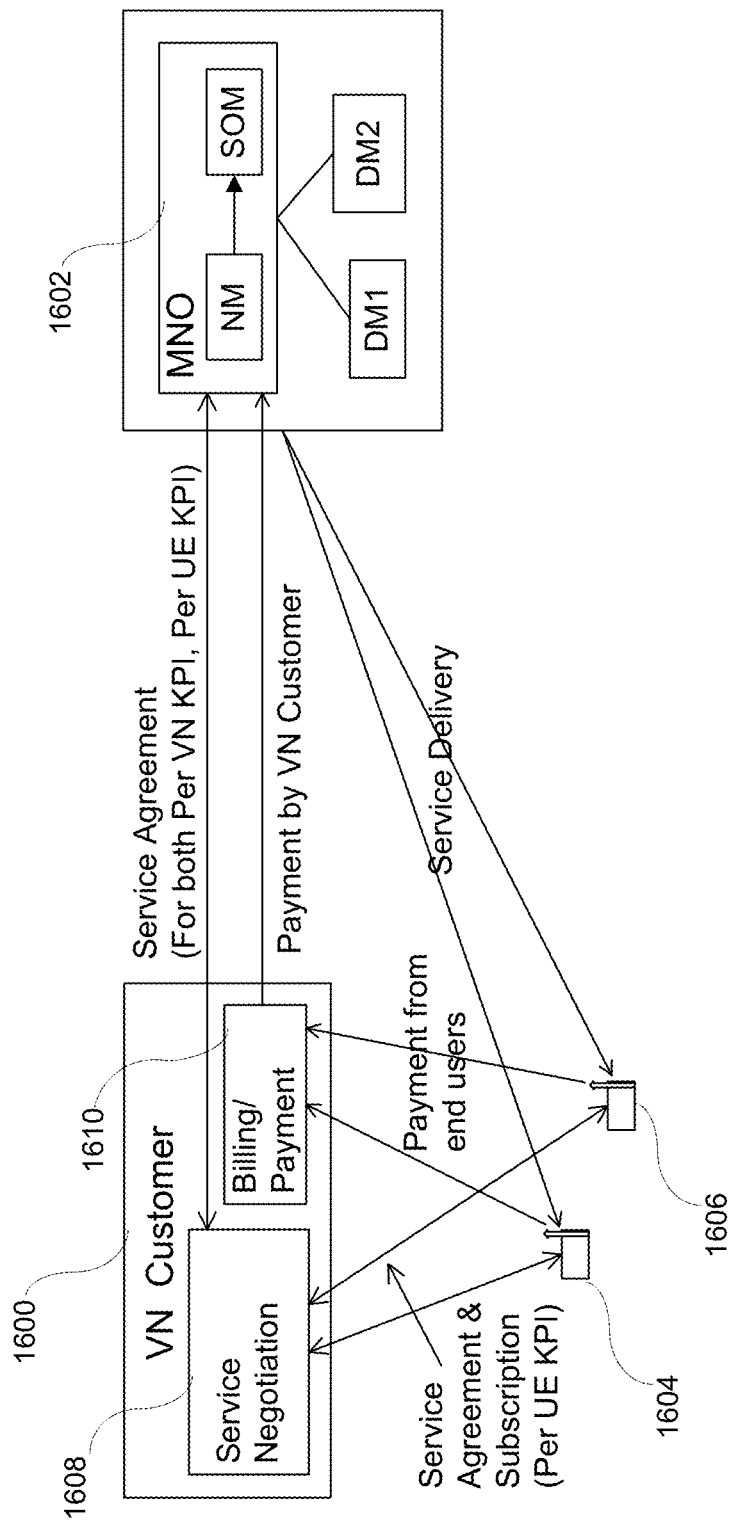
FIG. 7 is a block diagram illustrating an embodiment of a system for an on-demand session charging system employing virtual network customer charging.

Embodiments of the present invention provide methods and systems for providing end-to-end (e2e) service and supporting a VN customer in collecting charging data associated with its end user(s) use of the service. The end users are further customers of the VN customer. FIG. 7 depicts an example of this method and system in which an MNO 1602 provides a Virtual Network with e2e service requirements, and the VNO (the VN Customer 1600 in this case) charges its end users or device owners, the charging amount being based on the data provided by the MNO 1602. The MNO 1602 uses an NSI exclusively for this service.

As illustrated in FIG. 7, end users 1604 and 1606 communicate with the SN 1608 of VN customer 1600 regarding SLA and subscription information (e.g. including per UE KPIs). An SLA, for example specifying both per-VN KPIs and per-UE KPIs, is established between VN customer 1600 and MNO 1602. The MNO 1602 delivers service to end users 1604 and 1606. The MNO 1602 provides charging support to the VN customer 1600. This support may entail the collection of charging data at different locations in the network, and providing this collected data to the VN customer 1600. Payment is made from the end users 1604 and 1606 to the billing collection entity 1610 of the VN customer 1600. The VN customer 1600 provides payment for operation of the VN to the MNO 1600.

In this example, the SLA includes an undertaking to satisfy the end user requirements of the VN customer. Penalties may be included for not meeting service KPIs indicative that these requirements have or have not been satisfied. KPIs may include one or more of: per session KPI policies of end users; per user KPIs and policies of end users; and per VN customer KPIs (aggregate service) and policies of end users. The MNO 1602 provides end user charging support and VN customer charging.

The MNO may also provide support to the VN customer (VNO), to allow the VN customer to collect charging data associated with its subscribers so that it can undertake any number of different subscriber billing practices. The support may include traffic monitoring and executing required charging data collection functions, on a per-user basis. The MNO may also monitor traffic violations and provide indications of same to the VN customer. Aggregate traffic based charging may also be done if usage-based charging is applied in SLA.

The MNO may further provide certain management capabilities to the VN customer. For example, the MNO may provide network performance monitoring capabilities for use by the VN customer in monitoring performance of its VN or associated network slice. Provision of management capabilities may be provided and charged for separately, e.g., on a monthly basis.

In one embodiment of the present method and system for providing e2e service and charging support to a VN customer, the charging is levied for use of a customized connectivity slice (VN) having a fixed or specified demand. The customer specifies demand statistics for different time periods, or over different geographical regions, or both, for its slice. Table 1 provides an example of a set of demand statistics.

TABLE 1

| Time Slot | Region | Service Type | Traffic Demand | Penalty |
| --- | --- | --- | --- | --- |
| 1 | A | s1 | m1, v1 | F1, t1 ... |
| 1 | A | s2 | m2, v2 | F2, t2 ... |
| 1 | A | s3 | m3, v3 | F3, t3 |
| 1 | B | s1-s3 | — | — |
| 1 | C | s1-s3 | — | — |
| 2 | A | s1-s3 | — | — |
| 2 | B | s1-s3 | — | — |
| — | — | | | |

In some embodiments, the MNO admits the request only if it can substantially guarantee (e.g. guarantee with at least a predetermined threshold amount of probability) that the demand can be satisfied. In some embodiments, the MNO is allowed (e.g. under the SLA terms) to share resources among multiple slices, but still provides statistical guarantees. Certain admission control parameters can be readily identified because the MNO caters to a fixed demand in a given time and space. Penalties may be specified for violating these guarantees. Based on a consideration of the penalties, a network operator may determine how much room is available to obtain multiplexing gain.

There are two generic charging principles, namely flat fee charging vs. differentiated charging, that may be addressed using embodiments of the present method and system for providing e2e service and charging support to a VN customer.

First, consider geographical flat charging vs. region based charging. For geographic flat charging, traffic at any location within the network is subjected to the same charging rates. The MNO may prefer not to distinguish different geographical areas for reasons of operation simplicity. In some lightly loaded networks, charging the same rate in all regions may be easier from an operational point of view, and the added complexity of varying the charging rates in different regions may be offset by the extra operational complexity In networks where there are different levels of service in the same area (e.g. small cell, macrocell or WiFi coverage overlapping) and where there are known operational hot spots, there may be a benefit to the network operator to apply a surcharge for data transmitted on a congested RAN. In response to the differential charging, the customer may introduce some traffic spreading over time and space for which traffic monitoring, controlling, policing, controlling generation may be performed.

Second, consider flat charging over time vs. different charging for different time periods. For flat charging, instead of different time periods, total traffic over the period or peak traffic-based demand specifications are employed. The MNO may benefit from providing demand as a total over the period as it might desire compensation for wastage of resources under low traffic loads. Again in this case, the customer may introduce some traffic spreading over time and space for which traffic monitoring, controlling, policing, controlling generation may be performed.

The manner in which charging data is recorded, to support either geographic or temporal differentiated billing, will vary. Both the time and location of the connection needs to be recorded and provided towards the end user. Furthermore, it may be necessary to include a network congestion measure. The location of the charging data collection functions can also vary, and the data collected at different points can differ. There may be need for a consolidation of this collected data before providing it to the VN Customer.

The VN customer may have multiple service/traffic types. For example, in a virtual network that may provide service to a different individual customer population there are at least two approaches to specifying the demand in the SLA. One approach is to employ individual service type based demand specifications. In this example, the VN customer admits users or controls user traffic such that the traffic demands for specific traffic types in each region are not exceeded.

A second approach for specifying demand is to specify an aggregated equivalent demand for all the service types. In this case, the VN customer may gain partial benefit of multiplexing and allow higher traffic from urgent or important applications. However, penalties are not in this case implemented based on individual traffic types. Therefore, the VN customer does not have the option of giving higher importance to certain traffic types over others, unless there are specific measures. The VN customer may employ a mechanism to control the individual traffic types and may request some or all of the following information from the network: filtering, smoothing, marking, and prioritization information.

Using this second method, the VN customer can admit users, control user traffic, or both, in such a manner that the aggregated traffic demand is not exceeded and services can be prioritized to increase overall service satisfaction according to customer wishes.

In some embodiments of the present method and system, collection of charging data for a customized connectivity slice (VN) having a fixed or specified demand can be varied between VNs. The VN customer may have contracted for a fixed amount (statistical specification) of traffic demand in a given area while a second VN customer may have a different arrangement. In this case there can be two scenarios, as described next.

In one scenario, customer devices produce less traffic than is specified in the SLA for a given duration in a given area. In this case, a customer controlled Traffic Alert Response (TAR) function may send a message to the devices to start low priority services, activate more devices, etc.

In the second scenario, customer devices produce more traffic than is specified in the SLA for a given duration in a given area. In this case, the customer's end users can unexpectedly generate excess traffic (in one or both of downlink and uplink) over and above traffic levels specified in the SLA. The excess may be an excess in statistical limits specified in the SLA. This can occur when the end users/devices move into the same geographical area. For example, in this case, although individual user's traffic may have limits, the aggregated traffic from all the users can be large. This can also occur when the end users/devices each increase traffic. For example, in an MTC application, a common event trigger such as a weather change may trigger a large traffic increase, or an important live event may prompt a large number of users to stream audio or video content of the event at the same time.

A slice specific traffic monitor (e.g. provided as a network controlled user plane function) may detect the traffic increase event based on statistics and inform a network controlled policy enforcement and charging function of same. This function may be a control plane function, slice specific function or common function. A customer controlled TAR function can also be informed. The SLA may specify how to handle excess traffic in a slice. This may include a specification for handling excess traffic temporarily, long-term, or both, and the specification may vary over geographical regions. In some embodiments, the network may carry the excess traffic if possible (possibly for an extra charge or under some other conditions specified in the SLA). This attempt may be performed under a "best try" approach, meaning a selected amount of additional connectivity services are allowed while still guaranteeing quality. This approach may differ from a standard best effort approach, in which the network would provide the best effort/single sessions it can.

If the SLA has no provision for handling excess traffic or the system cannot provide additional connectivity (e.g. due to capacity constraints), a policing function may enforce traffic policing at its ingress points (e.g. downlink (DL) GWs). Traffic in specific geographic regions may be policed by identifying the traffic going to those regions and policing them.

Additionally, a slice-specific traffic estimator in TAR may identify the potential risk of exceeding a traffic profile and inform its devices to limit less urgent or time-sensitive traffic and change priorities specified to the network for different applications flows of that slice.

Figure 8:
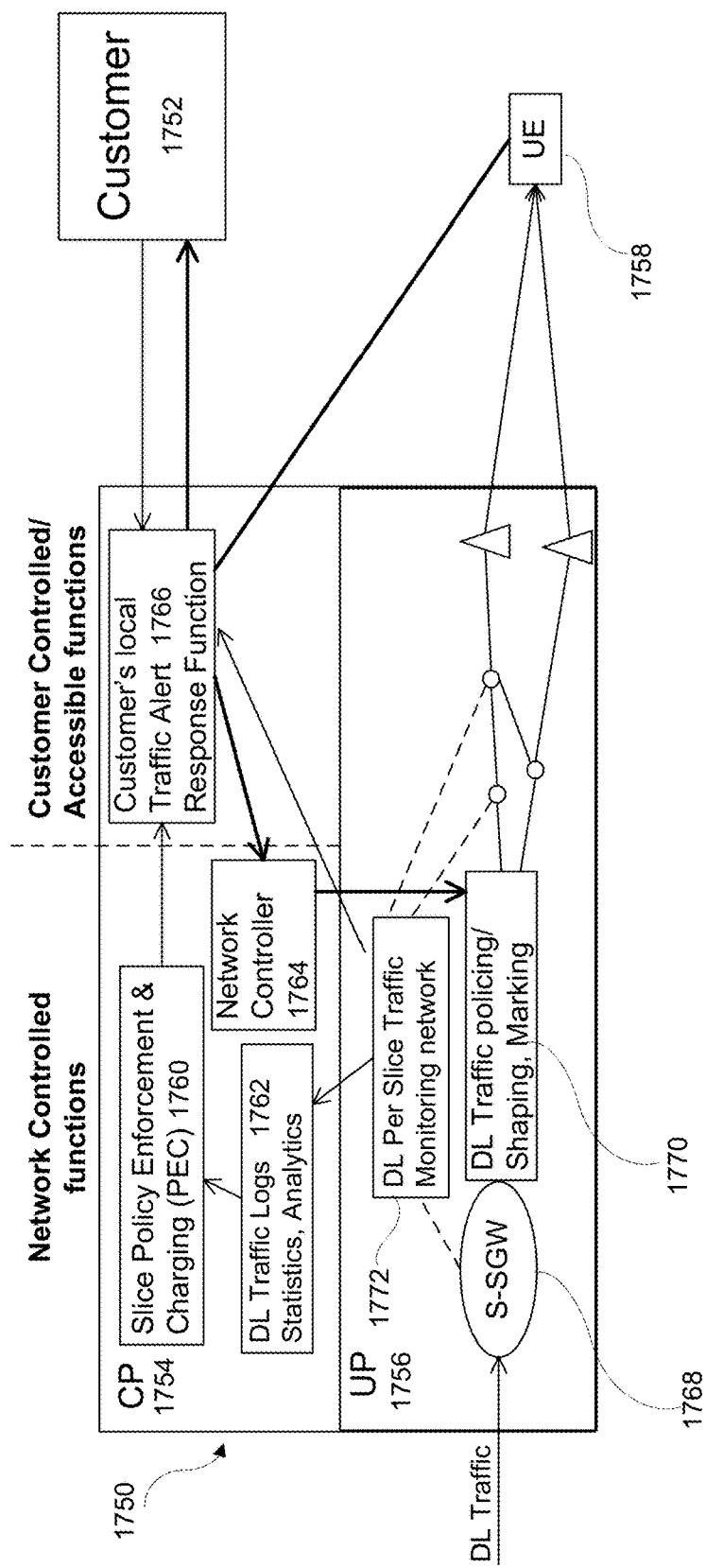
FIG. 8 is a block diagram illustrating aspects of the interaction between domains of a system for virtual network customer charging that includes traffic control, according to an embodiment of the present invention.

FIG. 8 illustrates interactions between slice specific functions in an embodiment of the present method and system involving charging is for a customized connectivity slice (VN) having a fixed or specified demand.

As illustrated in FIG. 8, slice specific functions of a network slice 1750 may be network controlled functions of customer controlled/accessible functions. The control plane (CP) 1754 for the network slice 1750 includes the network-controlled Slice Policy Enforcement & Charging (PEC) function 1760, DL Traffic Logs Statistics, Analytics function 1762 and Network Controller 1764, as well as the Customer's local TAR Function 1766. The user plane (UP) 1756 of the slice 1750 includes ingress point s-SGW 1768, a DL Traffic policing/shaping/marking function 1770 and DL Per Slice Traffic Monitoring network 1772. As shown in FIG. 8, the CP 1754 and 1756 functions interact with one another to provide service to UE 1758 and to monitor traffic. The customer 1752 communicates SLA based traffic profiles and traffic controlling function parameters for its customer fairness to TAR function 1766, which in turn communicates with Network Controller 1764 and UE 1758 and received traffic monitoring information from the DL Per Slice Traffic Monitoring network 1772. TAR function 1766 communicates with the Customer 1752 informing the traffic stats and regions, and may request a re-negotiation of SLA.

Downlink (DL) Traffic is monitored at ingress points (GW), such as s-SGW 1768 as well as at various sections of the network. If a specific network segment traffic (e.g., particular geographical area traffic) exceeds the statistical bounds as per the SLA it is reported to the policy and charging entity for that slice.

If the situation is not acceptable, the customer's TAR function 1766 can be informed and the TAR function 1766 will inform the network controller 1764 to control traffic, the UE 1758 to control traffic. The customer 1752 can also be consulted to determine whether service renegotiation is desired. As used in this context, the term "control" refers to, for example one or more of: limiting, stopping, prioritizing, aggregating, and marking traffic.

In one embodiment of the present method and system for providing e2e service and charging data collection to support to a VN customer, charging data collection is performed for a customized connectivity slice (VN) having resource reservation (or hard slice) with a fixed charge.

When the amount of resources given to a slice is fixed, the slice operator/customer (VN operator) may desire that the assigned capacity and resources are used efficiently. An obstacle to this arises when the devices do not provide enough capacity or exceed resource usage in a given network segment. Embodiments of the present method and system functions to use the resources to get an adequately high benefit to its devices/applications by using one or more of:

a mechanism to monitor slice specific resource usage (using a network controlled function) for specific network resource;

a mechanism for the network to prioritize/filter/police traffic across a given network resource according to the instructions given by a customer controlled function in the slice (control plane); and a customer controlled function configured to identify the traffic variations in different network segments (as well as geographical locations) and depending on the resource utilization by the customer slice, to change the priorities of traffic in different network segments, for different customer devices, or both.

The customer controlled function further performs one or more of the following: advising the resource assignment functions in the network to control the traffic, advising the customer devices to switch off, or switch on or enable/disable specific applications, changing priorities etc., and informing the customer CSM to take further action if necessary. The further action may be, for example, to change the SLA. If resource usage is low repeatedly for specific periods the customer may consider altering the SLA to reduce the reserved amount of resources for that period.

In embodiments in which e2e service and charging data collection support are provided to a VN customer and charging is performed for a customized connectivity slice (VN) having resource reservation (e.g. using hard slicing) with a fixed charge, operations can be similar those supporting the embodiment (already described above) in which a fixed traffic demand is contracted by the VN customer. However, instead of traffic monitoring, the network monitors now monitor the resource usage and the devices using those resources. This supports providing the customer function with information regarding what type of traffic and what device traffic is anticipated to pass through a congested area.

The customer function can then take action to control (e.g., prioritize, filter, limit, or compress, or a combination thereof) relevant traffic.

In some embodiments, instead of controlling individual device traffic, traffic generated in a given access node or given geographical area may be controlled. To do this, the customer function may use historical data, such as which traffic (e.g., which device's traffic) historically passed through a given network segment. It should be noted that a network segment here may be a single node, a single virtual network function (VNF) or a single link or combination thereof.

Further details embodiments providing e2e service and charging support to a VN customer, in which charging is for a customized connectivity slice (VN) with dynamic control of traffic by the customer for a resource reserved slice or hard slice are now described. In some such embodiments, the customer (or representative function) may have requested a certain amount of resources for its end devices/users. The customer function may then obtain current traffic distribution and traffic generating device statistics. The customer can also be provided with access to a traffic controller function in the network, which is configured to instruct specific devices to control their traffic to meet the traffic capability of the slice considering the customer's service priorities.

For example, as a result of a trigger, a large number of devices in an area may generate traffic. In one response, the customer function may implement a polling method to generate traffic for each device sequentially. In another response, the customer function may have pre-classified its users into groups (e.g., into groups A, B, C, and D) and allow only one category of users to send traffic at a given time when congestion happens. Thus traffic is spread out in time. Alternatively, or in addition, the customer function may change a priority scheme to allow high priority users to use the network when congested.

In another embodiment of the present method and system for providing e2e service and charging support to a VN customer, charging is performed for a customized connectivity slice (VN) that is contracted for a variable traffic (pay-as-you-go type) having a fixed charge. In this embodiment, the customer is charged for the services used plus network operation costs. The network operation costs can possibly be a limited or minor amount of the overall charge. A maximum cap for aggregated traffic may be defined for each service type, and service provision is not necessarily guaranteed if the cap is exceeded. If aggregated traffic is high there may be additional charges applied even when some services are not used. These operating conditions present a challenge to VN customers when providing a pay-as-you-go type services to its end users, and charging support may be provided to mitigate this challenge.

In such embodiments, charges (e.g. end user charges) may be specified based on a variety of factors, such as but not necessarily limited to: service type, QoS, bit volume and priority (high priority customers being charged at a higher rate).

From the VN customer point of view, cost reductions may be achieved by limiting certain types of traffic. Traffic filtering may be done at various points so as to inhibit forwarding of unnecessary or redundant traffic (e.g., messages from two nearby sensors).

Dynamic charging can be employed in various embodiments of the present invention, such as in support of methods and systems for providing e2e service and charging support to a VN customer. Special dynamic charging methods may involve dynamic charging based on network loading, competitive environment, or both. Special dynamic charging methods may involve dynamic charging based on the user location, time, or both. This may include user-in-the-loop charging, for example including and using location or time change (or location and time change) suggestions for the user. Special dynamic charging methods may involve charging based on bargaining/auctioning schemes.

Although the present discussion relates in part to embodiment in which charging is levied for providing e2e service, it is noted that dynamic charging may be also be applied to on-demand session based charging and charging for providing a VN service with a network topology.

In support of dynamic charging to a VN customer, in some embodiments, the MNO informs the customer of charging changes from time to time. Charging changes may be triggered for example based on the current network state and based on current market competition. Charges may be specified as being variable with respect to factors such as one or more of: service provided; QoS provided; priority of communications or services (e.g., high priority ones are charged higher); number of services provided; number of flows provided; traffic volume; geographical region; time of day or week; and resource costs.

From the point of view of the VN customer, it may be desirable to reduce the costs by changing traffic dynamically. Traffic filtering may be performed at various points so that unnecessary or redundant traffic is inhibited from being forwarded based on time and region (e.g., separate messages from two nearby sensors may be inhibited).

Figure 9:
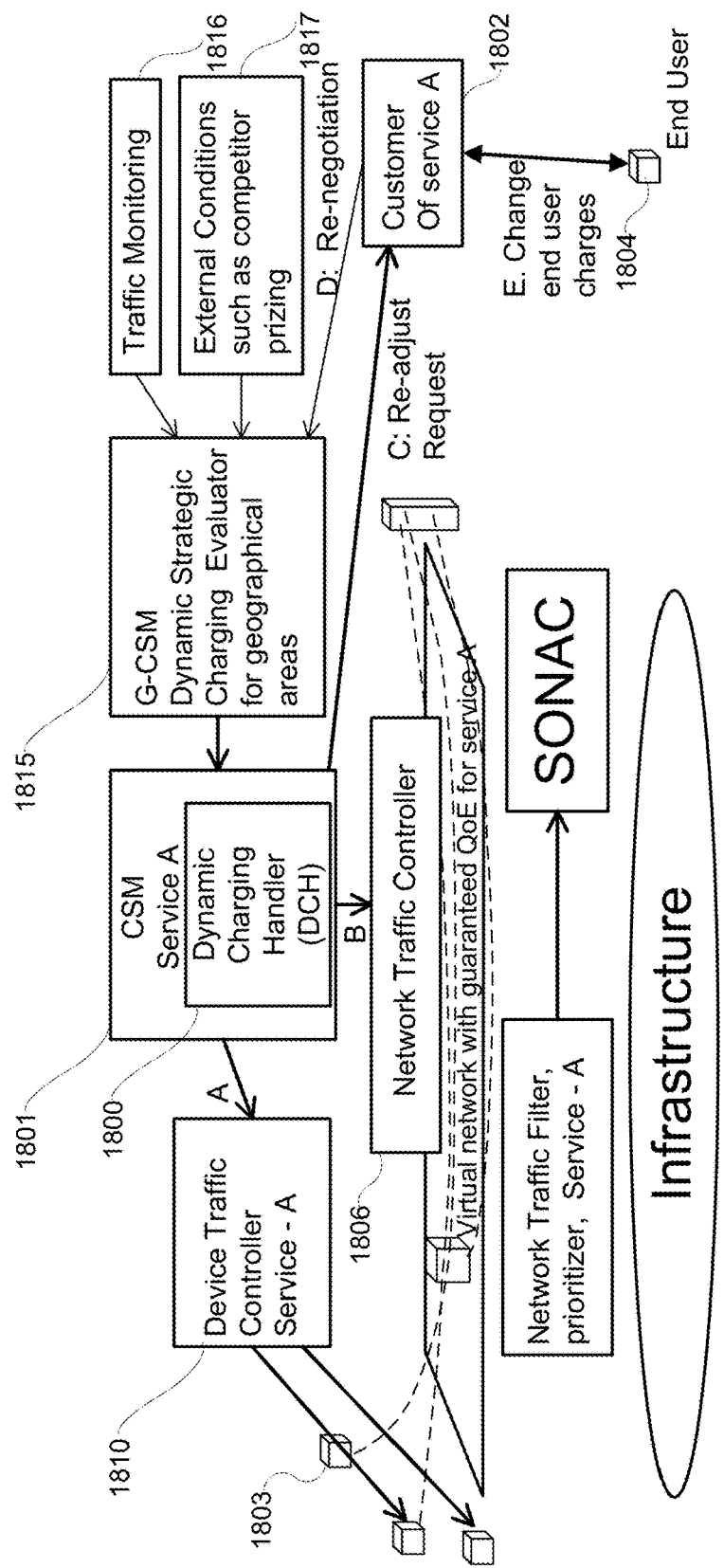
FIG. 9 is a block diagram illustrating an embodiment of a system for dynamic charging to a VN customer.

FIG. 9 depicts components of a system that provides dynamic slice capability changes to adapt to dynamic charging changes, provided according to an embodiment of the present invention. In this system, the network may implement demand-based charging, in which charges may be increased during peak demand times or for specific geographical areas. Certain customers may be able to shift traffic away from peak times, peak areas, or both. Traffic shifting may be accomplished via device traffic control, adjustments prioritization levels, adjustment to device triggers, etc. Traffic prioritization, smoothing, rejection, filtering, or a combination thereof, may be performed by functions in the network in response to CSM instructions. A user-in-the-loop approach, in which users actively adjust operations during peak demand times in response to a notification, may also be used.

As illustrated in FIG. 9, the Dynamic Charging Handler (DCH) function 1800, which resides in the CSM 1801 for Service A, can take several actions as instructed by the customer 1802 of service A. For example, DCH function 1800 may (A) instruct end users or devices (e.g. device 1803) to adjust traffic or temporarily stop transmissions from certain devices. These instructions may be transmitted via a device traffic controller 1810 for Service A. The DCH function 1800 may also (B) provide instructions to Network Traffic Controller 1806 not to accept certain traffic types. Additionally or alternatively, the DCH function 1800 may (C) notify the customer 1802 to renegotiate or re-adjust its service request. Re-negotiation (D) may then proceed via interaction with a G-CSM dynamic strategic charging evaluator 1815 or comparable function. This function can use monitored traffic levels 1816, external conditions 1817 such as competitor pricing, or both, to influence the re-negotiation. The DCH function 1800 may also alternatively notify the customer 1802 to (E) change charges it levies to its end users (e.g. user device 1804) (if dynamic charging is allowed in the customer network).

In one embodiment of the present method and system for providing e2e service using dynamic charging methods, dynamic slice capabilities may change in response to dynamic charging applied by the network. A network may apply a dynamic charging policy based for example on network load and resource availability. In order to control the cost, a VN customer may reduce/increase the capabilities, size, or both, of the slice used to provide that customer's VN and related services. The customer (or representative function) has access network charging information for example via a particular interface. This network charging information may vary based in part on geographical area. A customer function may respond to charging changes by requesting a reduction or increase in the slice capabilities, size, or both. The customer function can dynamically negotiate with the G-CSM (SN) to effect the requested reduction or increase, along with corresponding charging adjustments. A customer-controlled traffic controller function residing in the network may be provided and used to instruct specific devices to control their traffic to meet the traffic capability of the slice, considering customer's service priorities.

In an example of this embodiment, the customer function may have pre-classified its users (e.g., as group A, B, C, D). The customer function then allows only one group of users to send traffic at a given time when congestion occurs. In another example, the customer may have and use explicit traffic controlling commands transmitted to individual users/devices in order to control traffic-generating operations thereof.

Figure 10:
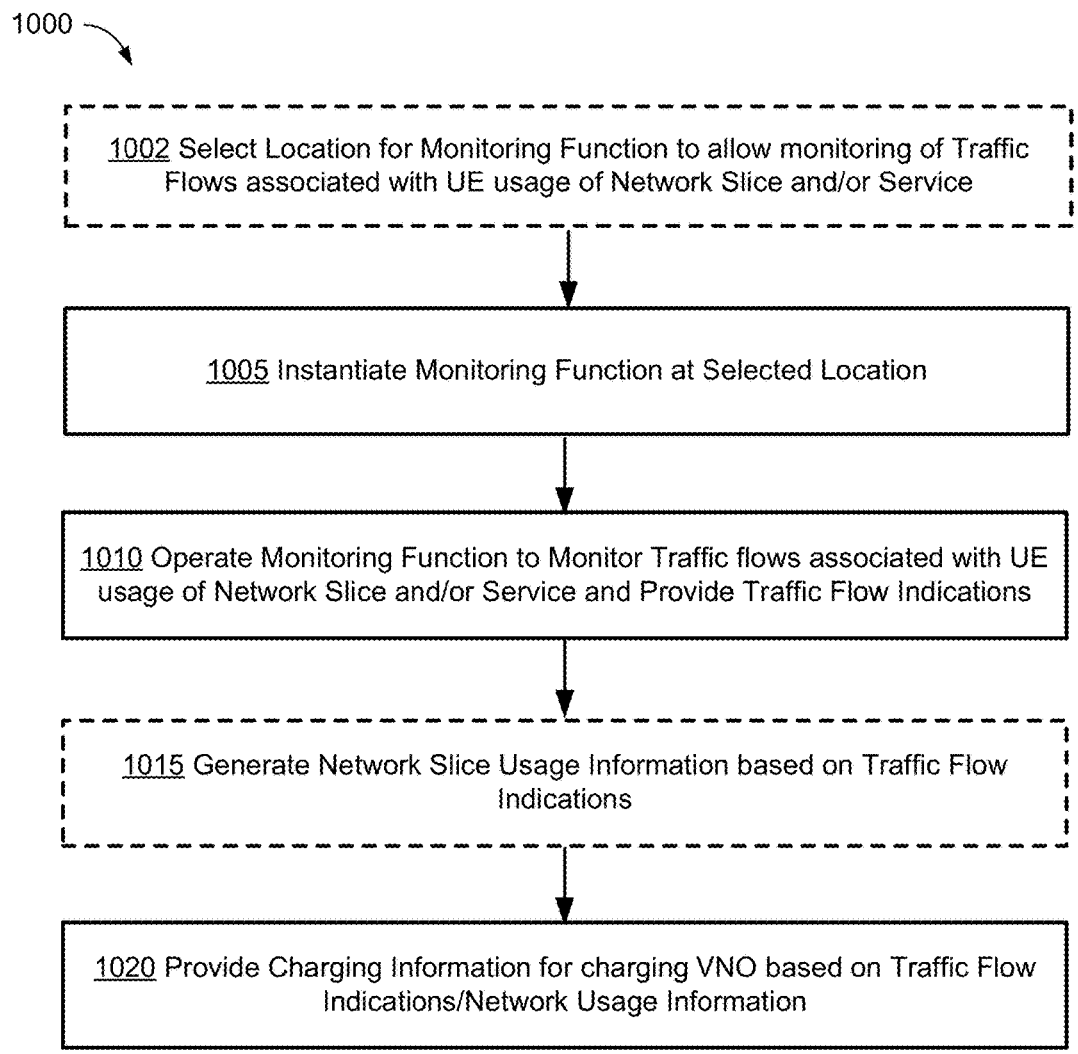
FIG. 10 illustrates a method for collecting network usage information, according to an embodiment of the present invention.

FIG. 10 illustrates a method 1000 for collecting network usage information, according to an embodiment of the present invention. The method 1000 includes instantiating 1005 a monitoring function at a location in a communication network. The location is selected to allow at least one of monitoring and tracking of traffic flows associated with a plurality of UEs using a network slice instantiated in the communication network. In some embodiments, the method may optionally include selecting 1002 the location. The plurality of UEs use the network slice to access a service. Where the method does not include selecting the location, the selection of the location of the monitoring function may be defined a priori. The method includes operating 1010 the monitoring function to monitor the traffic flows and to provide indications of the traffic flows. The method optionally further includes generating 1015 network slice usage information based on the indications of traffic flow. The method further includes providing 1020 charging information for use in charging a virtual network operator (VNO) customer based on the indications of the traffic flows, or based on the network usage information. The plurality of UEs are subscribed to the VNO customer or operated by the VNO customer.

As will be understood based on the foregoing disclosure, charging of the VNO customer can be based on one or a variety of factors. For example, the VNO customer can be charged based on a total rate of demand for the service or a rate of demand per geographical area, or based on total network resource usage for providing the service to the UEs, based on a pay-as-you-go model for aggregated per-UE monitoring, or based on a combination of the above. The pay-as-you-go model is an on-demand service model, in which charges are levied as service is provided, rather than on a subscription basis.

Figure 11:
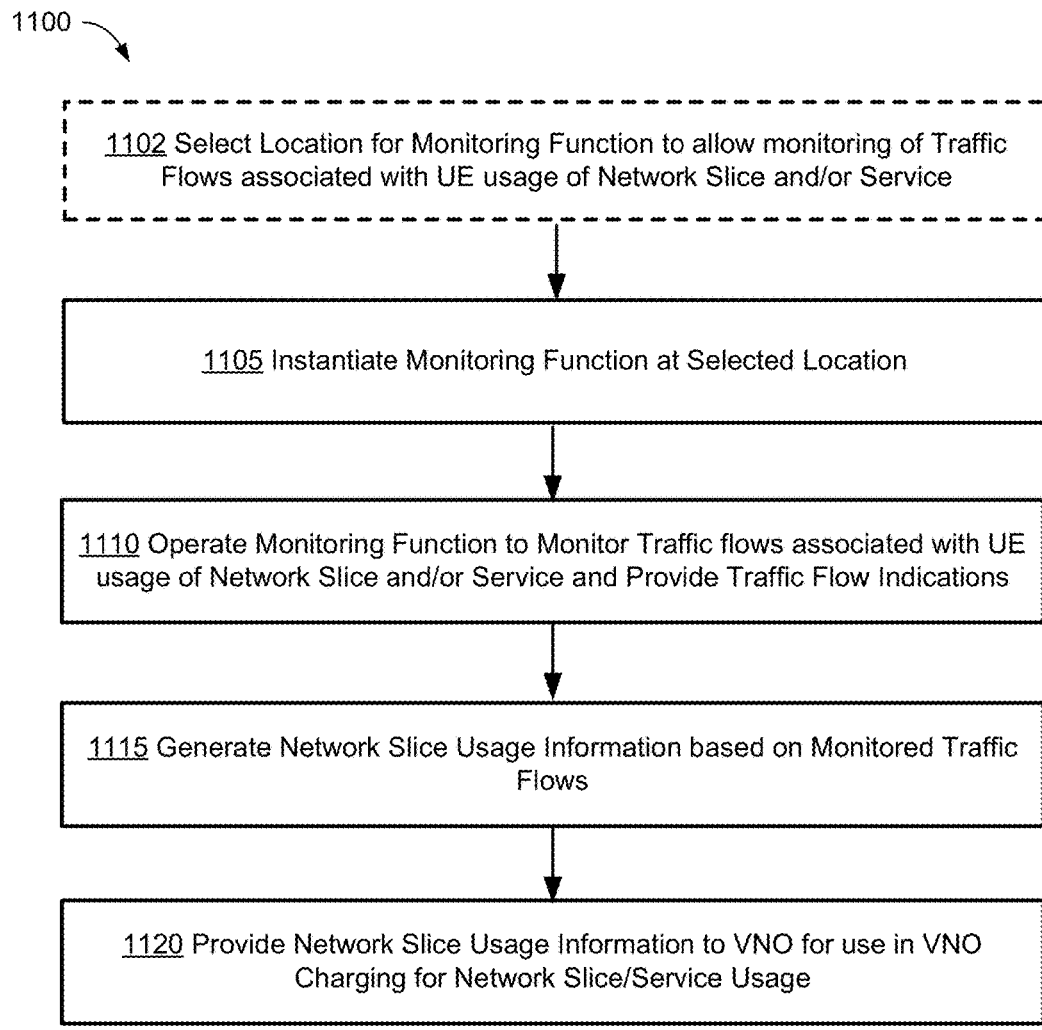
FIG. 11 illustrates a method for collecting network usage information, according to another embodiment of the present invention.

FIG. 11 illustrates a method 1100 for collecting network usage information, according to another embodiment of the present invention. The method 1100 includes instantiating 1105 a monitoring function at a location in a communication network. It will be understood that the step of instantiating a monitoring function may also be carried out by transmitting an instruction to have the monitoring function instantiated. The location is selected to allow monitoring or tracking of traffic flows associated with usage, by one or more UEs, of a network slice instantiated in the network. In some embodiments, the method may include selecting 1102 the location. The method includes operating 1110 the monitoring function to monitor the traffic flows and to provide indications of the traffic flows. The one or more UEs use the network slice in accordance with a subscription to a service provided by a virtual network operator (VNO). The method further includes generating 1115, by the monitoring function, network slice usage information based on the traffic flows. The method further includes providing 1120 the network slice usage information to the VNO for use by the VNO in charging for usage of the network slice, or the service, or both, by the one or more UEs.

Figure 12:
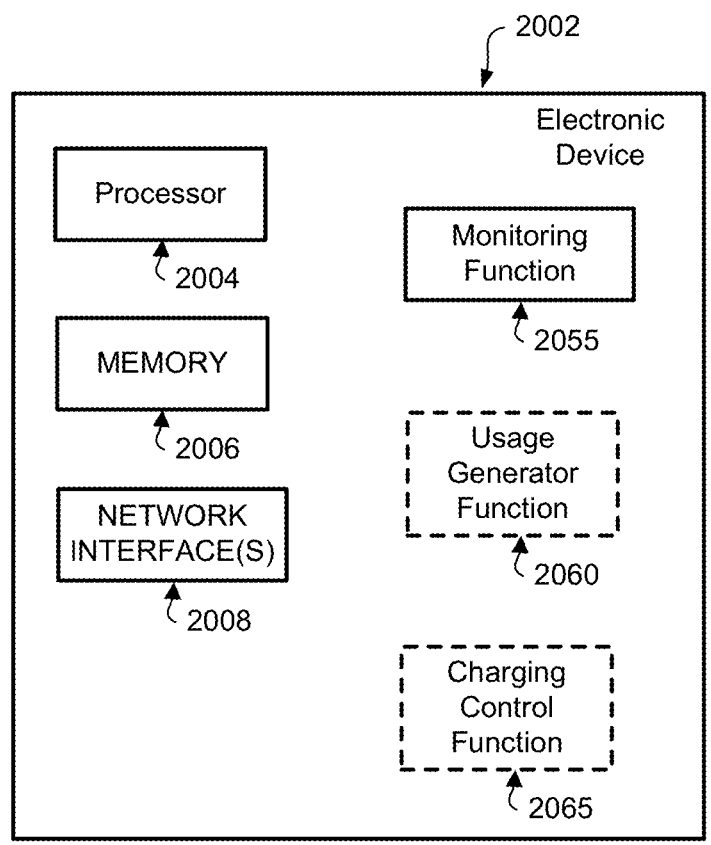
FIG. 12 illustrates an electronic device for collecting network usage information, according to an embodiment of the present invention.

FIG. 12 illustrates an electronic device 2002 for collecting network usage information, according to an embodiment of the present invention. The electronic device includes a processor 2004, a memory 2006 and a network interface 2008. The device includes a monitoring function 2055, and optionally further functions such as a usage generator function 2060 and a charging control function 2065, which are provided using the processor 2004, the memory 2006 and the network interface 2008 in combination, for example by execution of provided computer program instructions. The network location of the device 2002 is selected to allow monitoring of traffic flows associated with usage, by one or more UEs, of a service accessed via a network slice instantiated in the network. Another electronic device may select the network location and direct instantiation of the device 2002.

The monitoring function 2055 is configured to monitor the traffic flows for the one or more UEs. The monitoring function 2055, or an associated usage generator function 2060, is further configured to generate indications of the traffic flows, for example in the form of network usage information. In some embodiments, the monitoring function 2055, or an associated charging control function 2065, is further configured to generate and provide charging information for use in charging a Virtual Network Operator (VNO) customer based on the indications of the traffic flows. The plurality of UEs are subscribed to the VNO customer or operated by the VNO customer. In some embodiments, the monitoring function 2055, or the charging control function 2055, is further configured to provide the network usage information to the VNO, for use by the VNO in charging for usage of the network slice by the one or more UEs.

Figure 13A:
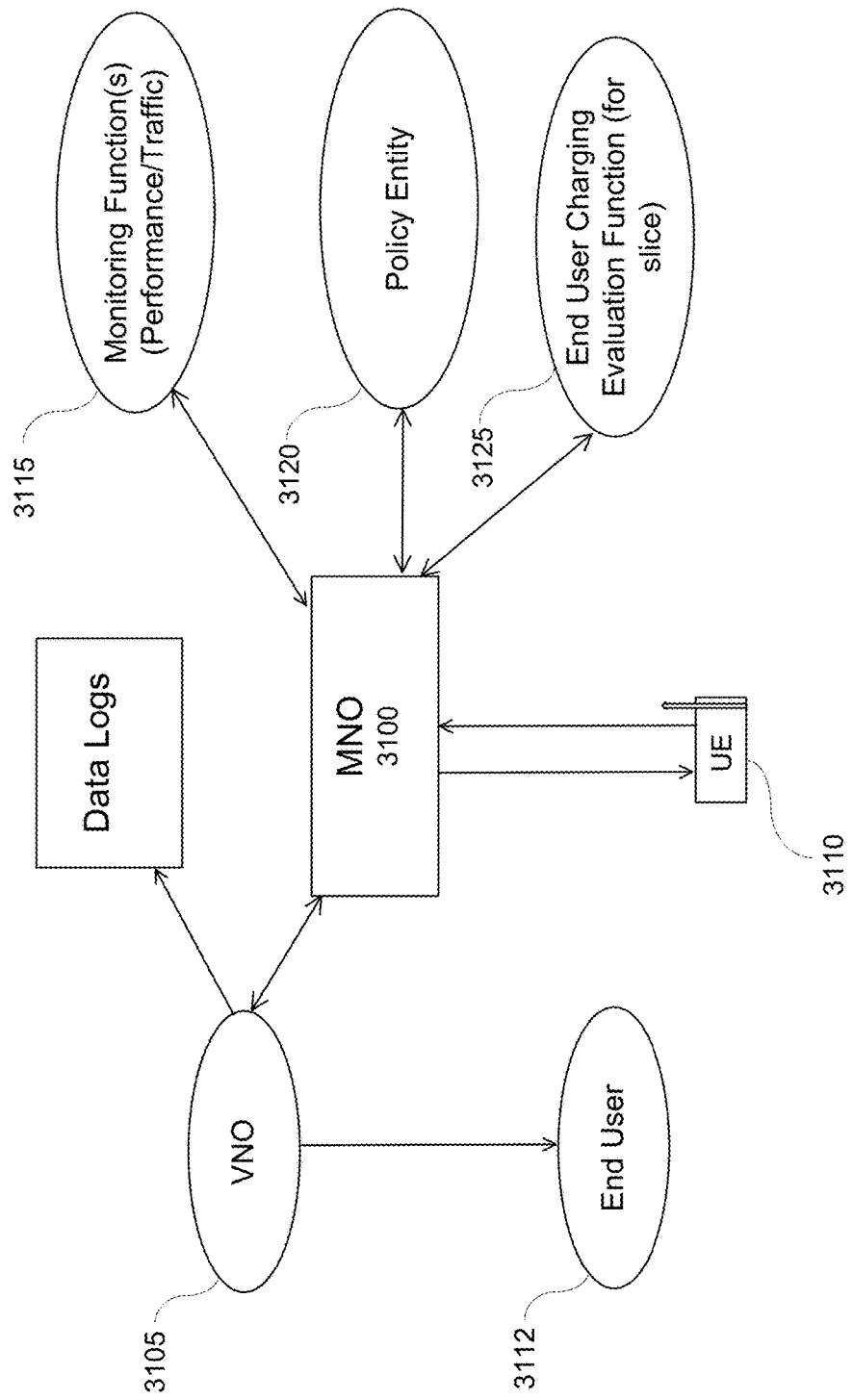
FIG. 13A illustrates interaction between entities including a monitoring function, a VNO customer and a UE associated with the VNO customer, according to an embodiment of the present invention.

FIG. 13A illustrates interaction between entities including a monitoring function 3115, a VNO customer 3105 and a UE 3110 belonging to an end user 3112 associated with the VNO customer 3105, according to an embodiment of the present invention. An MNO 3100 provides UE access to the network and directs operation of the monitoring function 3115 and coordination with the VNO customer 3105. In the present embodiment, the end user 3112 is subscribed to the VNO customer 3105 and the UE 3110 initiates an on-demand session for accessing a service.

Prior to initiating the on-demand session, a service level agreement is established between the VNO customer 3105 and the MNO 3100, a network slice supporting the service is created, and the monitoring function is instantiated at an appropriate location for monitoring or tracking of traffic flows associated with UEs using the network slice. The network slice may be created specifically for providing services for the VNO customer 3105, and the network slice may be an existing slice or a new slice. The SLA may include an agreement on providing required end using charging information from the MNO (or monitoring function thereof) to the VNO. Users may be charged differently according to their prioritization. Charging information may be different for different types of per-user monitoring information. Types of monitoring information can include some or all of: service/flow type and duration; traffic volume (e.g. Bit volume) per service/flow type; resource usage; and number of flow/sessions/per service.

The SLA may include an agreement on providing required end user penalty evaluation parameters. Penalties may be incurred when traffic does not conform to the SLA (e.g. when network or service performance is non-conforming). An example of non-conforming performance is a data rate, provided to an end user or network slice that is under or over levels agreed to in the SLA. Traffic monitoring operations by the monitoring function, including collection of geographic and time information, can be prepared accordingly, in order to monitor for non-conformance conditions. Performance monitoring aspects can also be prepared, including configuration of parameters for monitoring service delivery performance events such as service non-availability, service drop out, service blocking. In some embodiments, user-related penalties may be higher or lower depending on the priority of a user. The SLA may include an agreement on how VNO customer 3105 charged by the MNO 3100. Bulk charging may be on the basis of one or more of: specified demand per geographical area; specified resource; a pay-as-you-go charging model based on aggregated monitoring information such as the types mentioned above; and dynamic charging. Furthermore, the MNO 3100 may receive a list of devices from the VNO customer 3105. The list can include device specific details, such as any or all of: priorities, individual charging rates if applicable, charging information that need to be provided to the VNO, as well as security mechanisms, such as authentication mechanisms to be used or that are supported. The devices include devices that are authorized to access the provided service.

In various embodiments, as mentioned above, charging can be based on specified demand per geographical area. In some such embodiments, the payment entity initially indicates a demand for each geographical area (and possibly for different time intervals on a geographic area basis) for a given type of service. Charging can, in some embodiments, be based on the indicated amount of demand rather than the actual amount of traffic, even if actual traffic amounts are lower. If the actual amount of traffic exceeds the specified demand, the MNO may block the excess traffic or charge additional amounts for overage. The specified demand may be expressed as a statistical function. For example, the specified traffic demand may indicate an average demand of 5 Mbps with a peak demand of 8 Mbps, for a given time interval in a given geographical area. As another example, the specified traffic demand can be a truncated Gaussian distribution with a mean of 5 Mbps.

In various embodiments, as mentioned above, charging can be based on a specified resource. In some such embodiments, the payment authority specifies a required amount of one or more resources, such as processing resources, data transport resources, and wireless resource blocks or frequency bands. The resources can be specified as being required in particular geographic areas and particular time intervals. The MNO provides those specified amounts of resources in the specified areas and time intervals. Charging is based on the amount of provided resources, irrespective of how much of the resources are actually used. However, if the actual demand would result in more than the specified amount of resources being used, the MNO may block certain users or charge additional amounts for excess resource usage.

In various embodiments, as mentioned above, charging can be based on a pay-as-you-go charging model based on aggregated monitoring information. In some such embodiments, UEs with pay-as-you-go arrangements may incur charges based on the amount of traffic usage or amount of resource usage as indicated above. In this case, it may be the aggregated usage across all the UEs belonging to a payment authority that is bulk charged.

In various embodiments, as mentioned above, charging can be based on dynamic charging. In some such embodiments, dynamic charging is similar to pay-as-you-go charging, but charging is changed over time. That is, charging rates differ for different time intervals (or geographic regions) as specified in the SLA. Changes to charging rates may be communicated to UEs and the payment authority.

As an example of a penalty, if traffic demand is lower than specified in the SLA but the network does not provide the promise traffic volume capacity or capability, an SLA violation is detected and penalties can be assessed. Performance monitoring may include the monitoring QoS and QoE of individual sessions as well as slice-level KPIs (including network KPIs, slice KPIs and service KPI).

The SLA configuration and other operation of the MNO can be performed in association with a policy entity 3120 of the MNO which may be provided by the operator to the operator's management system. An end user charging evaluation function 3125 can also be instantiated for supporting charging operations for the network slice providing the service.

Figure 13B:
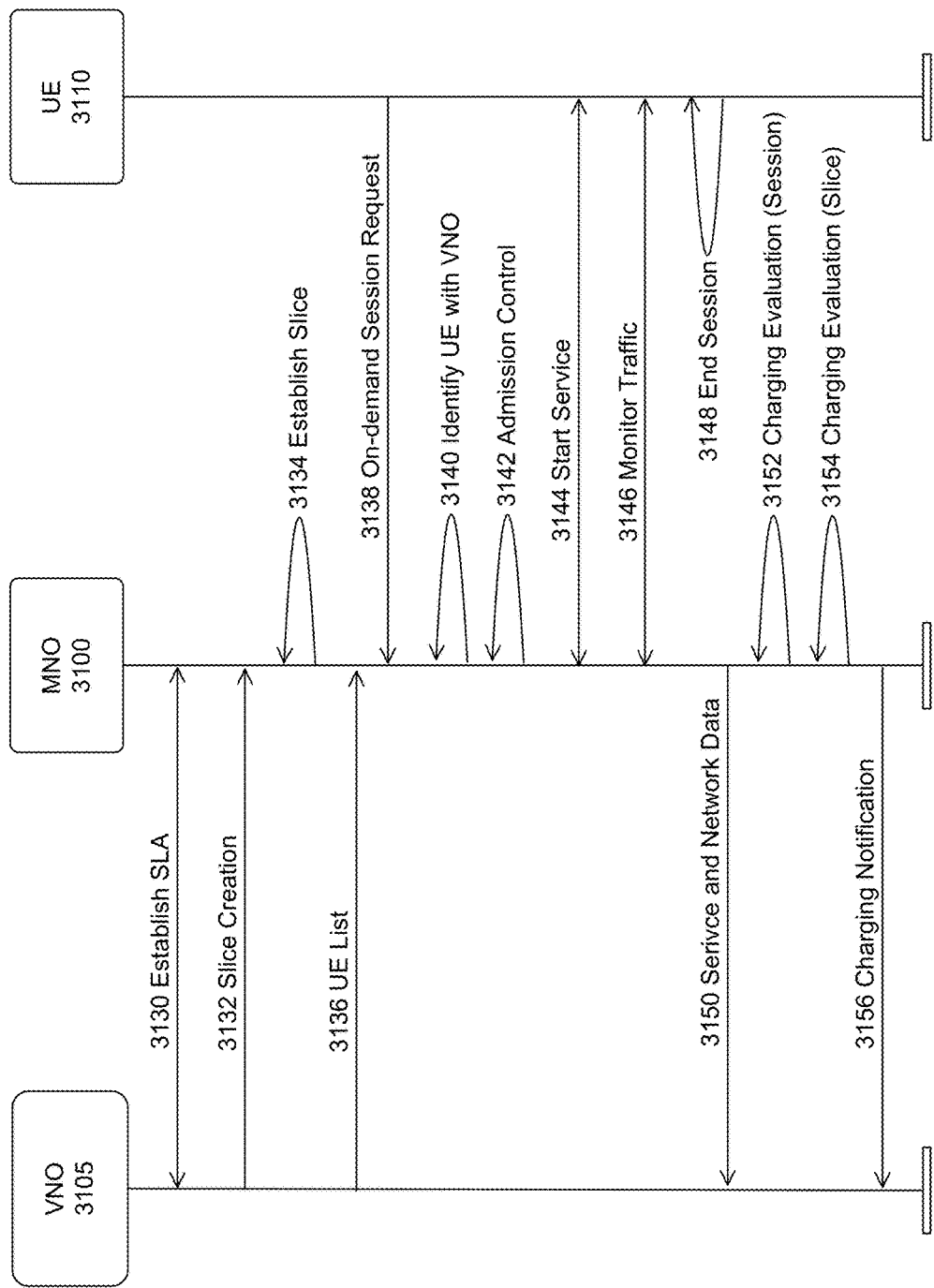
FIG. 13B illustrates a call flow diagram for the interaction of FIG. 13A.

FIG. 13B illustrates a call flow diagram for the interaction of FIG. 13A. According to FIG. 13B, the SLA is established 3130 by the MNO 3100 in cooperation with the VNO 3105. Next, the VNO 3105 directs 3132 the MNO 3100 to create a network slice for the service. The MNO accordingly establishes 3134 the network slice. The VNO 3105 also provides 3136 the list of UE devices to the MNO 3100. Next, a UE 3110 transmits 3138 an on-demand session request to the MNO 3100. The MNO consults the list and identifies 3140 the UE as being subscribed to the VNO 3105, and also identifies the service as an on-demand session. Next, admission control 3142 is performed. For example, if sufficient resources are available to support the session, the MNO may check whether traffic load or resource usage for the slice, along with a usage limit for the associated user, are not currently exceeded. If so, the session is admitted, and otherwise the session is blocked. Next, the MNO 3100 begins provision of the service and informs 3144 the UE 3110. The monitoring function 3115 also monitors 3146 the traffic flows associated with provision of the service to the UE 3110. Upon ending 3148 of the session, the monitored service data, network data, or both are provided 3150 by the MNO 3100 (or monitoring function 3115) to the VNO customer 3105. In some embodiments, user charging is evaluated by the MNO 3100. In this case, the end-user charging evaluation function 3125 performs 3152 charging evaluation for the session. This includes obtaining the monitored data and evaluating charging for the user. Charging evaluation is also performed 3156 for provision of the network slice. Per-slice charging information is used to determine a charging amount for charging the VNO customer as per the SLA, and the VNO is notified. This notification is not necessarily performed on a call by call basis but may be performed periodically according to the SLA. This charging evaluation can include evaluation of penalties for non-conformity to the SLA. The charging information, for both the session and the network slice, can be sent 3154 the user 3112, the VNO customer 3105, or both, as appropriate.

In FIG. 13B, as well as in other call flows and procedures as described herein, two phases of operation are included. First, a preparation phase is performed in which the network slice is prepared (and instantiated if required), an SLA is established, charging methods are established, and monitoring and policing functions are configured (and instantiated if required). Second, an operating phase is performed upon receiving a request from a UE for service. In the operating phase, service provision, monitoring and charging are performed, having been previously configured.

Referring again to FIG. 13A, a similar set-up can be used to support end-to-end communication services (not necessarily on-demand services) in an alternative embodiment. In such embodiments, establishing the SLA includes agreeing on penalties related to the end user charging information. Furthermore, the MNO may perform differentiated charging for different geographic areas, for different time periods, or both. The MNO may alternatively perform flat charging across certain geographical areas, time periods, or both, although the demand and value of resources may be different. This way the MNO can apply a simple charging mechanism to VNO but it can benefit from the traffic in low traffic areas.

In some such embodiments, per-network-slice (e.g. bulk) charging and monitoring operations may proceed as follows. As mentioned above, bulk charging may be performed on the basis of one or more of: specified demand per geographical area; specified resource; a pay-as-you-go charging model based on aggregated monitoring information such as the types mentioned above; and dynamic charging. For specified traffic demand or specified resource-based charging, the traffic or resource may be specified for specific geographical bins and specific time intervals. The requirement may be specified as fixed values or statistical requirements. An example statistical requirement is that, 10% of the time, the traffic rate is between 5-10 Gbps from Area X, for time T1 to T2, while 90% of the time the traffic rate is higher than 2 Gbps for the same area and time period. Network KPI (e.g. outage blocking) requirements can be similarly defined for specific time periods and geographical bins.

Also for specified traffic demand or specified resource-based charging, the MNO checks whether traffic loading (or resource usage) of the network slice associated with traffic for the VNO is close to a specified threshold. If so, the MNO may inform the VNO of this condition, indicating the time period and the geographical information. The VNO may respond by changing policies related to traffic policing (e.g. priority/dropping/limiting of traffic for certain flows) and the MNO may apply the new policies. The VNO may request to modify the SLA. The MNO may check the feasibility of the new SLA, and if the new SLA is feasible, the MNO agrees to same.

Also for specified traffic demand or specified resource-based charging, the MNO may take action to block new sessions of the VNO after service to the VNO exceeds predetermined limits on resource usage or specified number of UEs served.

In some embodiments, the total charges to the VNO may be calculated according to agreed-upon specific resource or traffic demands, and according to agreed-upon penalties for not meeting the network KPIs. Individual user traffic may be monitored to a degree that is sufficient for supporting a per-user charging method applied by the VNO. The user traffic data is then provided to the VNO for us by the VNO and charging its end users.

For resource usage and traffic carried-based charging to the VNO, the method by which the VNO charges its end users is not necessarily relevant to the method used for charging to the VNO. In some embodiments, there is a maximum cap for usage based charging, as not all the requests can be accommodated. Resource usage may be monitored for all VNO traffic. It is noted that, in the presence of multiplexing gain, the total VNO resource usage may be smaller than what is needed without traffic multiplexing. As such, one charging method involves accounting for traffic multiplexing gain, and charging only for the resource usages for supporting the total amount of VNO traffic. Another charging method involves refraining from accounting for traffic multiplexing gain, and informing the VNO of aggregated traffic usage. When the resource usage or traffic load of the VNO is above a predetermined threshold (e.g. for a specified time period, geographic area, or both) the MNO may inform the VNO of this condition. In some embodiments, the MNO may provide regular updates of such conditions to the VNO.

Figure 14:
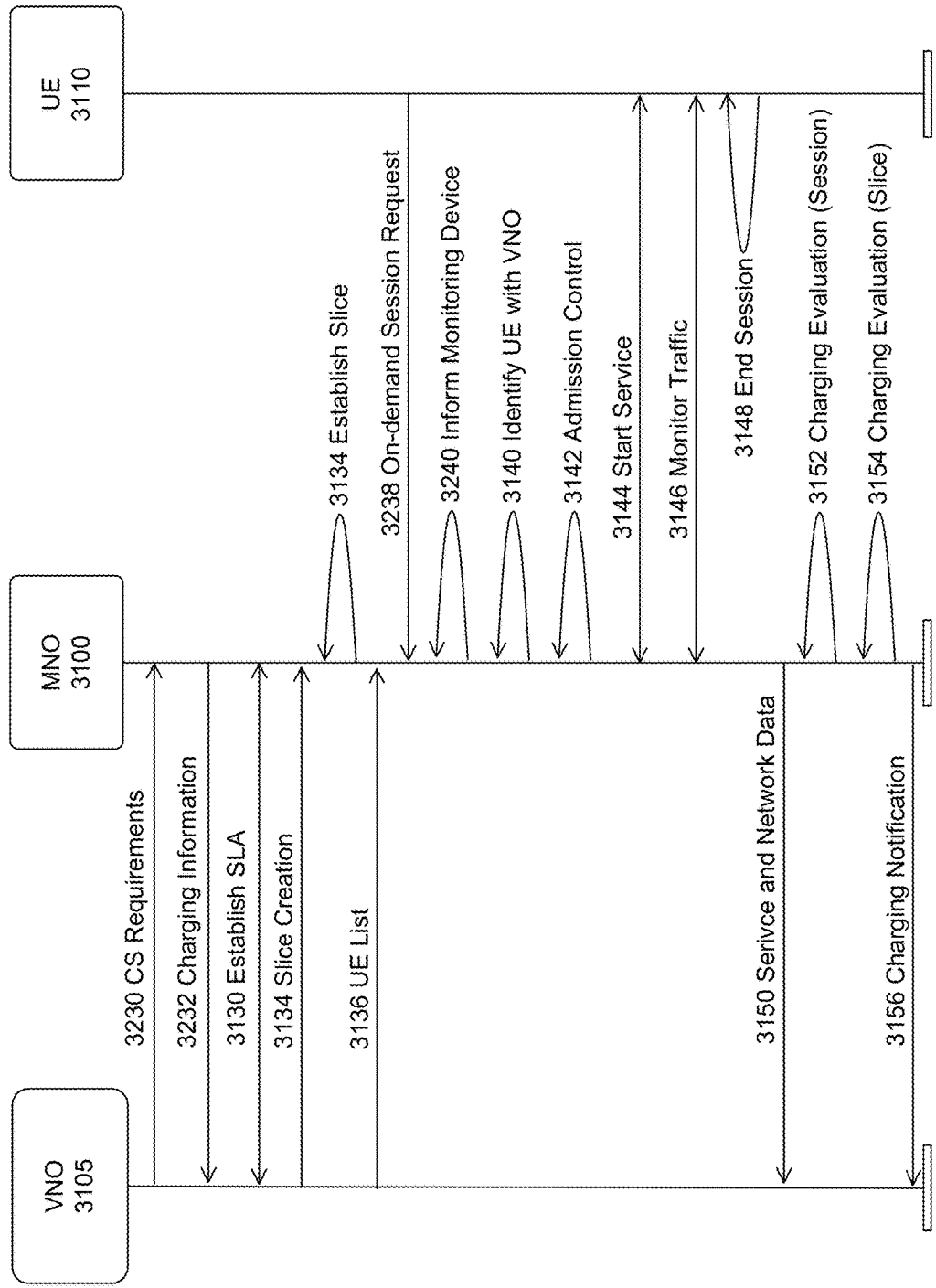
FIG. 14 illustrates a call flow diagram for the interaction of FIG. 13A, according to another embodiment of the present invention.

FIG. 14 illustrates a call flow diagram associated with supporting end-to-end communication services for this alternative set-up associated with FIG. 13A. The call flow proceeds similarly to that of FIG. 13B, except for the following. The involved session is not necessarily an on-demand session, and the on-demand session request 3138 (FIG. 13A) from the UE 3110 is replaced with a session request 3238 (FIG. 14). When the session is not an on-demand session, the UE is one that is already subscribed to the VNO. Furthermore, following the session request 3238, the MNO 3100 informs 3240 the monitoring function (monitoring device) to begin monitoring for the newly requested session. The MNO may also identify the requested service type, for use in monitoring and charging. The identification can be based on information in the UE's request. As such, the monitoring device can monitor multiple sessions and begin monitoring same as they occur. Furthermore, in FIG. 14, the call flow begins with the VNO 3105 transmitting 3230 CS requirements to the MNO 3100, and the MNO responds by transmitting 3232 charging information to the VNO.

Figure 15A:
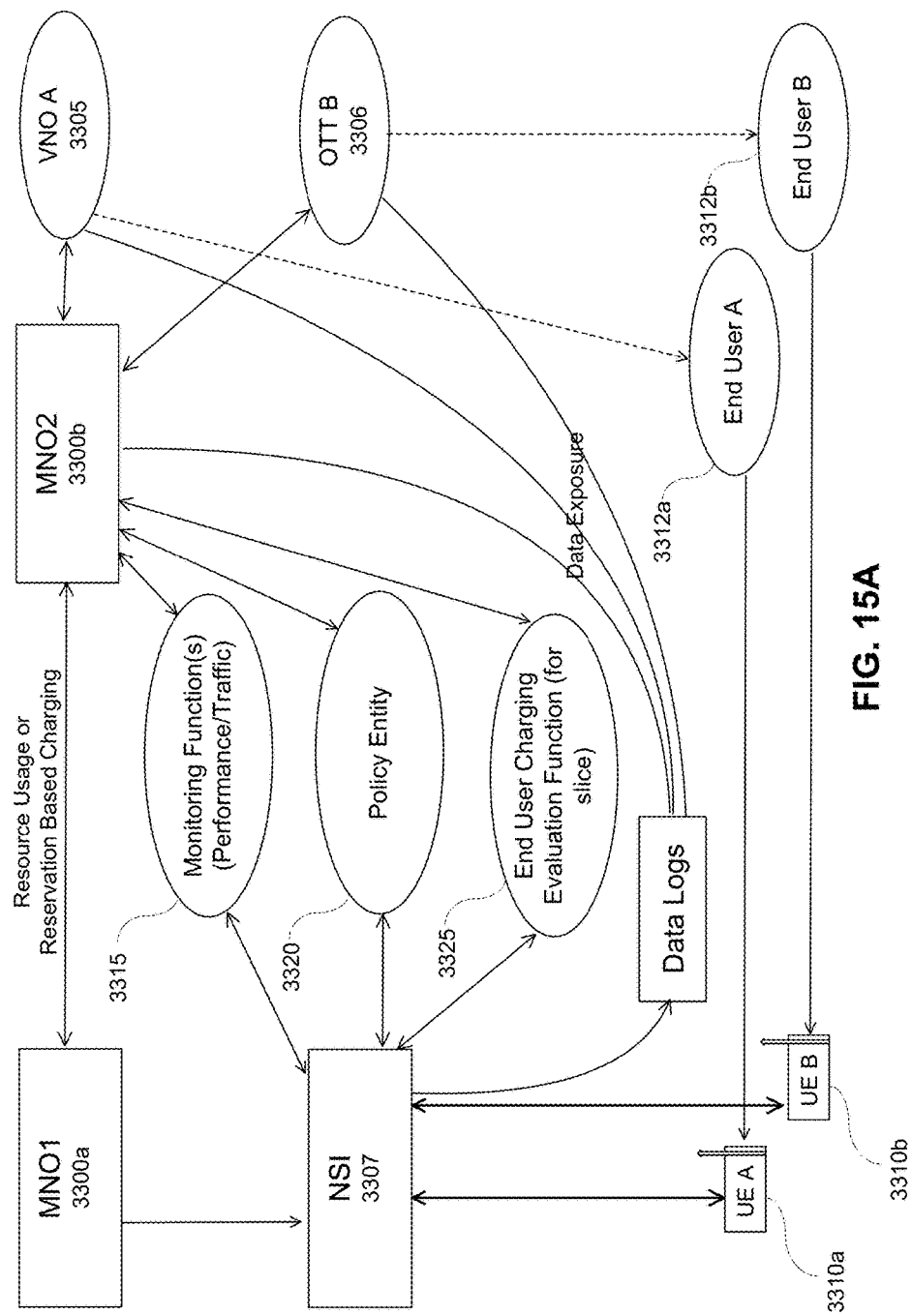
FIG. 15A illustrates interaction between entities including MNOs, VNOs, and UEs, according to another embodiment of the present invention.

FIG. 15A illustrates interaction between entities including two MNOs MNO1 3300a and MNO2 3300b, a VNO 3305, an over-the-top entity OTT B 3306, end users 3310a, 3310b, and their associated UEs 3312a, 3312b, according to another embodiment of the present invention. A network slice instance (NSI) 3307 is instantiated for providing service to the UEs 3312a, 3312b. One or more monitoring functions 3315 are instantiated and associated with the NSI 3307 and MNO2 3300b. A policy entity 3320 and end user charging evaluation function 3325 are similarly instantiated and associated with the NSI 3307 and MNO2 3300b. Data logs accept data from the NSI 3307 and the data is exposed (e.g. provided upon request) to each of the MNO2 3300b, VNO A 3305 and OTT B 3306. User A 3310a is a subscriber to VNO A 3305 and User B 3310b is a subscriber to OTT B 3306.

In more detail, FIG. 15A relates to embodiments in which a virtual network slice is provide for use by a customer along with management capability, which is also referred to as exposure. As such, the customer can configure the network for operation with its own services. This can provide more freedom and customer control, including control over how the network is monitored and what services are provided. In this case, the customer is also a MNO (MNO2) that provides services to third parties, such as VNOs. In such embodiments, charging may be based on what kind of management capability is provided to the customer, what resources are used/allocated to the customer, or the amount of traffic the customer causes in the virtual network, or a combination thereof.

Resource usage-based or reservation-based charging can occur between MNO1 3300a and MNO2 3300b. As such, one party (e.g. MNO1) can provide network slice access to another party (e.g. MNO2), in a network-as-a-service (NaaS) transaction. The party receiving network slice access can configure communication services to operate using the network slice. The party providing the network slice can charge the party receiving network slice access. The party receiving network slice access can provide further access to further parties and charge the further parties. Per-user monitoring and per-slice charging can be performed as described previously.

Figure 15B:
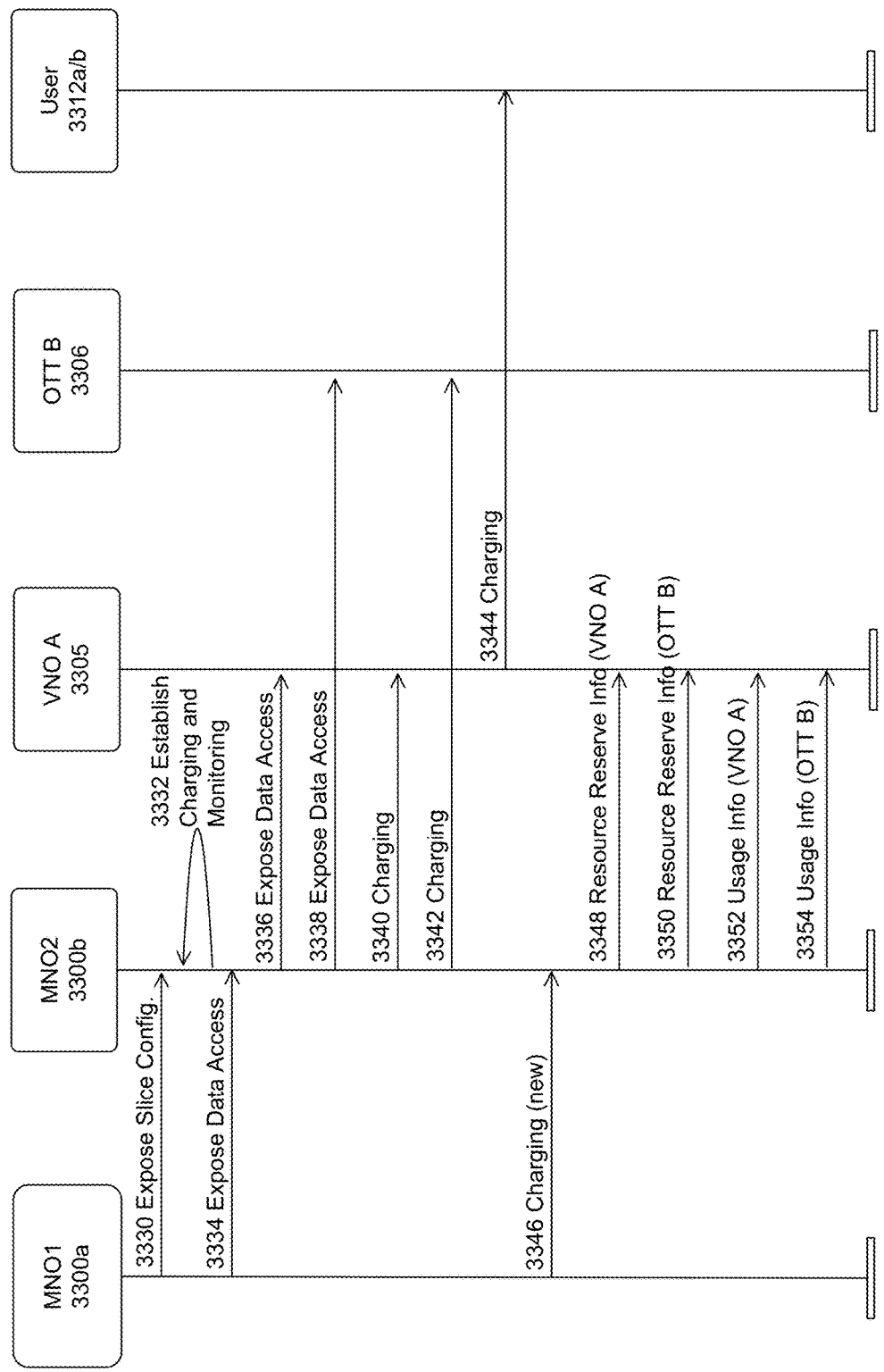
FIG. 15B illustrates a call flow diagram for the interaction of FIG. 15A.

FIG. 15B illustrates a call flow diagram for the interaction of FIG. 15A. This call flow relates primarily to network slice preparation and initial set-up. Network slice operation steps can proceed as described previously, for example with respect to FIGS. 13B and 14. However, it is noted that, if MNO1 3300a has its own communication service slices, the authorization process may be different than previously described.

According to FIG. 15B, MNO1 3300a allows MNO2 3300b to configure the slice for different service instances for different VNOs or over-the-top service providers (OTTs). This is performed by MNO1 exposing 3330 slice configuration capabilities to MNO2. Subsequently, charging and monitoring functions are established 3332 (e.g. at different locations) by MNO2. This may be performed by MNO2 or by MNO1 on behalf of MNO2. Next, MNO1 exposes 3334 data access (e.g. allows data access) to MNO2. MNO2 may also expose 3336 (allow) some predetermined data access to VNO A 3305, and expose 3338 some data access to OTT B 3306. As such, VNO A 3305 and OTT B 3306 can utilize the network slice via MNO2 3300b.

MNO2 3300b provides 3340 charging information to VNO A 3305, and also provides 3342 charging information to OTT B 3306. The charging information can be provided as described previously, for example with respect to FIG. 14. Charging 3344 to an end user 3312 by VNO A 3305 can also occur as described previously. However, individual user monitoring and reporting from MNO1 3300a may be performed differently as the end user 3312 needs to be identified to VNO A or OTT B, as appropriate. In various embodiments, data logs are separated and isolated when provided to VNO A or OTT B. MNO2 3300b may request that MNO1 3300a keep these data logs separate.

Additionally, MNO1 3300a may charge 3346 MNO2 3300b for providing the network slice access. The charging may depend on factors such as the amount of resource usage, the amount of resources reserved, types of management and control capabilities provided to MNO2 by MNO1, etc.

MNO2 3300b may provide 3348 resource reservation information to VNO A 3305 and may also provide 3350 resource reservation information to OTT B 3306. As such, MNO2 may perform separate resource reservations for its customers (VNO A and OTT B). MNO2 may accordingly request from MNO1 resource usage details of MNO2 customers (e.g. VNO A or OTT B) separately. Alternatively, MNO2 3300b may request combined resource reservation information for a group of its customers. Resource usage information is provided 3352 from MNO2 3300b to VNO A 3305, and also provided 3354 from MNO2 3300b to OTT B 3306. Similarly resource usage based charging may involve separate resource usage monitoring for each customer. Monitoring functions for each customer may be instantiated for this purpose, or a single monitoring function may perform monitoring for multiple customers.

As mentioned above, provision of the on-demand service can be subject to authentication. In some embodiments, credentials provided by the UE can include an identity of the designated payment entity, and authentication comprises verifying that the designated payment entity is responsible for paying for usage, by the UE, of the on-demand service. Verification can include querying the designated payment entity to confirm it accepts this responsibility.

In various embodiments, a per-pay-per-service model refers to a charging model in which charging rule parameters such as flat rate prices, charging rates, charging dependencies, etc. are implemented on an as-needed basis. The charging rule parameters can be defined at the time that the service is to be delivered.

In various embodiments, on-demand service refers to a service provision model in which a customer, such as a VN operator or end user, does not necessarily have a prior contractual relationship with a service provider, such as an MNO. Instead, parameters of service provision and associated charging are established at the time that the service is requested. That is, a prior SLA is not necessary.

In various embodiments, an on-demand session is a newly initiated session for which the user has not subscribed or for which the user has subscribed as a "pay as you go" type of service. The UE may be a UE which is not subscribed to the MNO or to any VNO that the MNO has a prior SLA with. In addition, a UE involved in an on-demand session can be a UE that is subscribed to a VNO to use a service according to a "pay as you go" service model.

The SONAC is described for example in Zhang, Hang, et al., "5G Wireless Network: MyNET and SONAC", IEEE Network Volume: 29, Issue: 4, July-August 2015, pp 14 to 23, which is incorporated herein by reference.

As described herein, KPIs include both UE KPIs and network (e.g. VN) KPIs. UE KPIs refer to performance indicators for service delivery to a particular UE. Network KPIs on the other hand refer to performance indicators for service delivery to a VN potentially serving multiple UEs. In some embodiments, a network KPI can be based on aggregate statistics of UE KPIs, for UEs served by the network. For example, given a particular UE KPI (such as data rate or percentage of time experiencing service outage), a corresponding network KPI can indicate a statistical distribution of this UE KPI over all UEs served by the network. Alternatively, the network KPI can include a score or value that is correlated with or generated based on such a statistical distribution.

It is noted that, in various embodiments, network KPIs are generated by a service provider by aggregating UE KPIs, for example by aggregating performance statistics of the UE KPIs, prior to transmitting the network KPI information to a VN operator.

Aggregate SLAs can be configured to benefit from statistical multiplexing gain. Statistical multiplexing gain refers to the gain in efficiency due to sharing of resources across multiple end devices with limited behavioural correlations. Aggregate SLAs therefore allow for some end devices to use resources that are going unused or under-used by other end devices. With large numbers of end devices, variability of aggregate behaviour is also limited. By using an aggregate SLA and plural devices, resource over-use or under-use tends to decrease.

As used herein, the term capability guarantee-based charging refers to a guarantee (or undertaking), provided by the service provider or MNO, to satisfy a set of service delivery parameters. These parameters may correspond to capabilities such as one or more of: link capacity, link delay budgets, service QoS, network KPIs (defined elsewhere), delay guarantee, guarantees regarding outages, etc. A guarantee may be for a fixed value or for a statistical guarantee. For example a statistical guarantee may state that 95% of the time, link capacity will be greater than 5 GB per second. Failing to meet a guarantee may cause penalties to be invoked, as set forth in the SLA.

Various embodiments of the present invention refer to geographical locations, areas, zones, bins, or regions. As mentioned, this can refer to user location, such as a hotspot or remote area. For example, the monitoring function may generate indications of geographic locations of end user devices involved in receiving the service, and charging may be based at least partially on these indications of geographic locations. In more detail, and in some embodiments, such geographical information can be generated and provided on a geographic resolution scale that is on the same order as or finer than the resolution of radio access nodes, or of the service area of a particular access node. For example, geographic bins can be defined as 1 m by 1 m or 10 m by 10 m regions arranged in a grid pattern. As another example, geographic bins can correspond to sectors served by an access node. As yet another example, geographic bins can refer to hotspots or locations proximate to an antenna of a distributed radio access node. As it another example, geographic bins can be based at least in part on UE signal strength. Solving a UE to a particular geographic bin can be performed based on information such as reported GPS position, radio triangulated or trilaterated position, access node association, etc.

In various embodiments, a user-in-the-loop (UIL) approach is implemented in which a VN customer, end user devices, or both, adjust operation based on notifications from another entity in the network, such as an MNO or charging entity. This approach allows for network traffic to be limited or shaped as early as possible, i.e. at the originating devices, rather than allowing the traffic to enter the network at an undesired time. By coordinating UIL across multiple devices or in mobile device, originating traffic may be shaped across both time and space. The charging related messages provided by the customer service management functions can be provided to the customer and can indicate charging rules, such as charging rules that vary over geography, time, or both.

The charging related messages can prompt the customer to adjust their access to the service, for example by adjusting timing of access or adjusting geographic location at which access is made. Adjusting geographic location may be performed by changing which UE performs the access or moving the UE performing the access. The charging related messages can prompt the customer to begin or cease service-related transmission from one or more controlled UEs, adjust traffic prioritizations of service-related messages, renegotiate the SLA, or a combination thereof. Charging related messaging can therefore facilitate a feedback process from the MNO to the VNO, end users, or both. For example, this may cause the VNO to adjust prioritizations of its end user traffic.

In various embodiments, a feedback mechanism is provided and configured to indicate one or more of: violations of QoS metrics applied to data provided according to the service; dynamic variations in a charging policy according to the negotiated agreement; and charging related messages for use in service traffic control or for provision to the customer (VNO or end user). The feedback mechanism can involve charging related messages. The charging related messages can indicate current charging rates for usage of the service, particularly when charging rates vary over time, location, or both.

Various embodiments of the present invention include providing a charging control function for generating customer charges according to a negotiated agreement and based on monitoring by monitoring functions. Providing the charging control function may include determining a location in the network for the charging control function, and instantiating the charging control function in the determined location. The location may be within a network slice which provides the service.

In some embodiments, the charging control function is configured to generate the customer charges based on one or more of the following indicators: an amount of data provided according to the service; a single or aggregate data rate provided according to the service; a bandwidth used according to the service; geographic locations of one or more end user devices involved in receiving the service; quality of service (QoS) metrics applied to data provided according to the service; a number of identifiable interactions with the service; amount of resources used in providing the service; a number of service sessions provided; satisfaction of key performance indicators described in the negotiated agreement; and times of access to the service. The monitoring function(s) can be configured to monitor operations in the network in order to generate the above indicators.

A monitoring function may be generic or dedicated for monitoring activity corresponding to: the service, a user of the service, or a session of the service.

In some embodiments, the service is provided directly to one or a plurality of end user devices, and the service comprises a single connectivity session provided in response to the service request.

In some embodiments, as will be understood in view of the above, traffic flow monitoring can include monitoring of various aspects and characteristics. Examples of such aspects and characteristics include: a type of service provided using the traffic flows; a duration of service provided using the traffic flows; a traffic flow type; traffic flow duration; a traffic volume per service type; a traffic volume per traffic flow type; network resource usage; number of traffic flows per service; and number of sessions per service. Monitoring can be done on a per-UE basis or on an aggregate basis, or both.

It should be understood that, when referring to entities such as an MNO, VNO, designated payment entity, customer, etc., some or all actions of these entities may be performed automatically using a corresponding computerized management system.

Furthermore, the management systems may receive configuration input from actual human operators, where appropriate, and automatically act on this configuration input in a specified manner. In particular, a policy entity can receive configuration input from a human operator, and act based on the configuration input. Therefore, for example, policy decisions can be made by human operators, who enter the corresponding configuration information into a management system. Negotiations can be performed automatically between management systems, with or without operator input.

It will be readily understood that, throughout the preceding discussion, the above-described network functionalities and operations may correspond to a method for use in supporting operation of a communication network, such as but not limited to a $5^{th}$ generation wireless communication network. The method may involve computer-implemented functions, namely functions which are implemented by one or more computing, communication and/or memory devices of the network infrastructure. Further, it will be readily understood that embodiments of the present invention relate to a communication network system or associated apparatus thereof, which is configured to perform the above-described network functionalities and operations. Again, the system or apparatus may comprise one or more computing, communication and/or memory devices of the network infrastructure.

Embodiments of the present invention may be implemented using specific servers or general-purpose computing, communication and/or memory devices. Computing devices used to implement method operations may include a processor operatively coupled to memory, the memory providing instructions for execution by the processor to perform the method as described herein. Embodiments of the present invention may be implemented at least in part using computing devices such as Application Specific Integrated Circuits, microcontrollers, and digital logic circuits. Embodiments of the present invention may be directed to improving internal operations of the communication network.

Embodiments of the present invention provide for an apparatus configured to operate as described above. For example, the apparatus may be configured to perform or direct methods as described herein. A system comprising multiple apparatuses is also provided.

Figure 16:
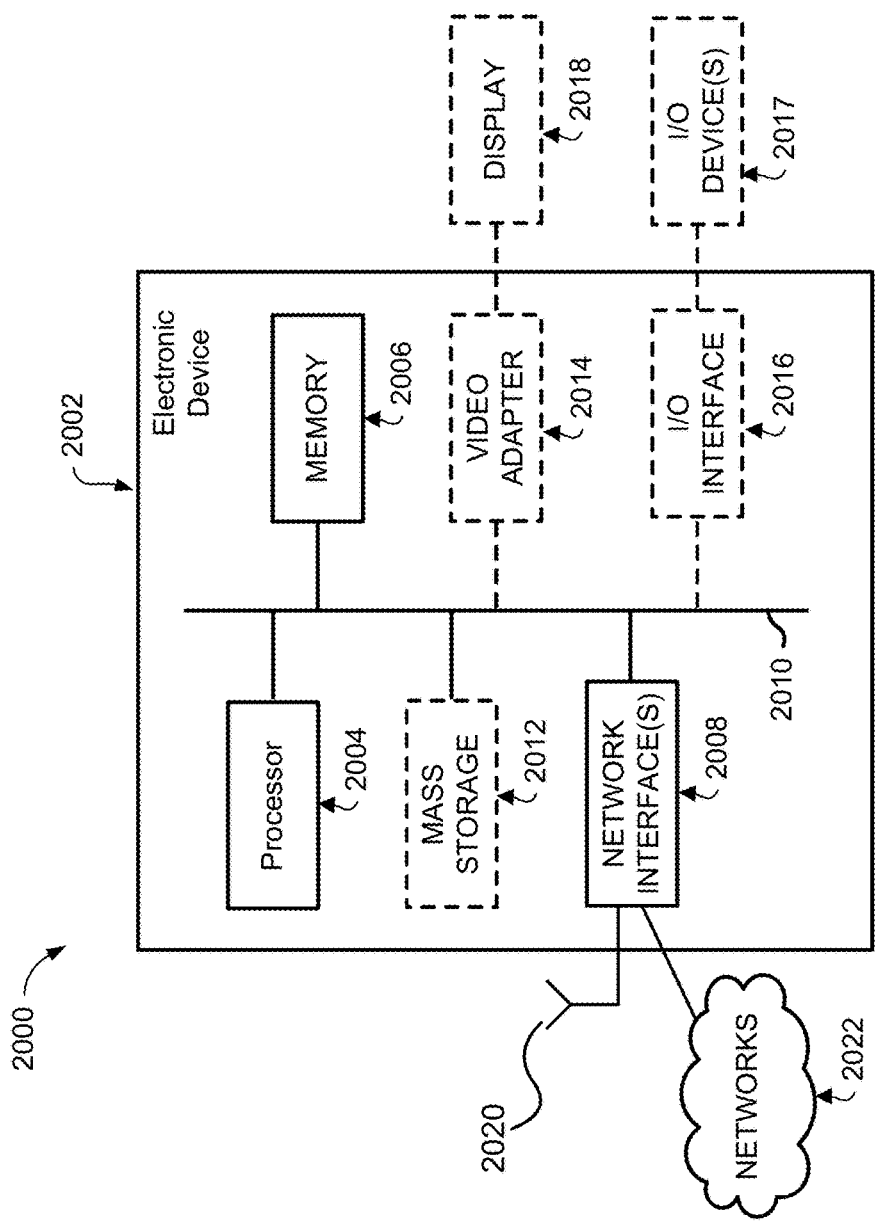
FIG. 16 is a block diagram of an electronic device within a computing and communications environment that may be used for implementing devices and methods in accordance with representative embodiments of the present invention.

FIG. 16 is a block diagram of an electronic device (ED) 2002 illustrated within a computing and communications environment 2000 that may be used for implementing the devices and methods disclosed herein. In some embodiments, the electronic device may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a device that connects to network infrastructure over a radio interface, such as a mobile phone, smart phone or other such device that may be classified as a User Equipment (UE). In some embodiments, ED 2002 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 2002 typically includes a processor 2004, such as a Central Processing Unit (CPU), and may further include specialized processors such as a Graphics Processing Unit (GPU) or other such processor, a memory 2006, a network interface 2008 and a bus 2010 to connect the components of ED 2002. ED 2002 may optionally also include components such as a mass storage device 2012, a video adapter 2014, and an I/O interface 2016 (shown in dashed lines).

The memory 2008 may comprise any type of non-transitory system memory, readable by the processor 2004, such as static random access memory (SRAM), dynamic random access memory (DRAM), synchronous DRAM (SDRAM), read-only memory (ROM), or a combination thereof. In an embodiment, the memory 2008 may include more than one type of memory, such as ROM for use at boot-up, and DRAM for program and data storage for use while executing programs. The bus 2010 may be one or more of any type of several bus architectures including a memory bus or memory controller, a peripheral bus, or a video bus.

The electronic device 2002 may also include one or more network interfaces 2008, which may include at least one of a wired network interface and a wireless network interface. As illustrated in FIG. 12, network interface 2008 may include a wired network interface to connect to a network 2022, and also may include a radio access network interface 2020 for connecting to other devices over a radio link. When ED 2002 is network infrastructure, the radio access network interface 2020 may be omitted for nodes or functions acting as elements of the Core Network (CN) other than those at the radio edge (e.g. an eNB). When ED 2002 is infrastructure at the radio edge of a network, both wired and wireless network interfaces may be included. When ED 2002 is a wirelessly connected device, such as a User Equipment, radio access network interface 2020 may be present and it may be supplemented by other wireless interfaces such as WiFi network interfaces. The network interfaces 2008 allow the electronic device 2002 to communicate with remote entities such as those connected to network 2022.

The mass storage 2012 may comprise any type of non-transitory storage device configured to store data, programs, and other information and to make the data, programs, and other information accessible via the bus 2010. The mass storage 2012 may comprise, for example, one or more of a solid state drive, hard disk drive, a magnetic disk drive, or an optical disk drive. In some embodiments, mass storage 2004 may be remote to the electronic device 2002 and accessible through use of a network interface such as interface 2008. In the illustrated embodiment, mass storage 2012 is distinct from memory 2008 where it is included, and may generally perform storage tasks compatible with higher latency, but may generally provide lesser or no volatility. In some embodiments, mass storage 2012 may be integrated with a heterogeneous memory 2008.

The optional video adapter 2014 and the I/O interface 2016 (shown in dashed lines) provide interfaces to couple the electronic device 2002 to external input and output devices. Examples of input and output devices include a display 2018 coupled to the video adapter 2010 and an I/O device 2017 such as a touch-screen coupled to the I/O interface 2012. Other devices may be coupled to the electronic device 2002, and additional or fewer interfaces may be utilized. For example, a serial interface such as Universal Serial Bus (USB) (not shown) may be used to provide an interface for an external device. Those skilled in the art will appreciate that in embodiments in which ED 2002 is part of a data center, I/O interface 2016 and Video Adapter 2014 may be virtualized and provided through network interface 2008.

In some embodiments, electronic device 2002 may be a standalone device, while in other embodiments, electronic device 2002 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

The apparatus (electronic device) may be dedicated to performing operations according to the present invention as described above, or the apparatus may perform multiple operations including those according to the present invention. The apparatus may be provided using network function virtualization. Depending on its purpose, the apparatus may be instantiated in the core network domain, access network domain, or on a customer-controlled device.

The apparatus may comprise one or a combination of functions as described herein. Such functions can be provided as aspects, features or modules of the apparatus. Functions include a monitoring function, a policy enforcement or policing function, a charging function, a charging control function, a customer service management function, a service function, a traffic alert response function, a resource assignment function, a data collection function, an accounting function, an aggregation function, a dynamic charging handler function, and a supervisory or control function for directing instantiation and configuration of the preceding functions.

Figure 17:
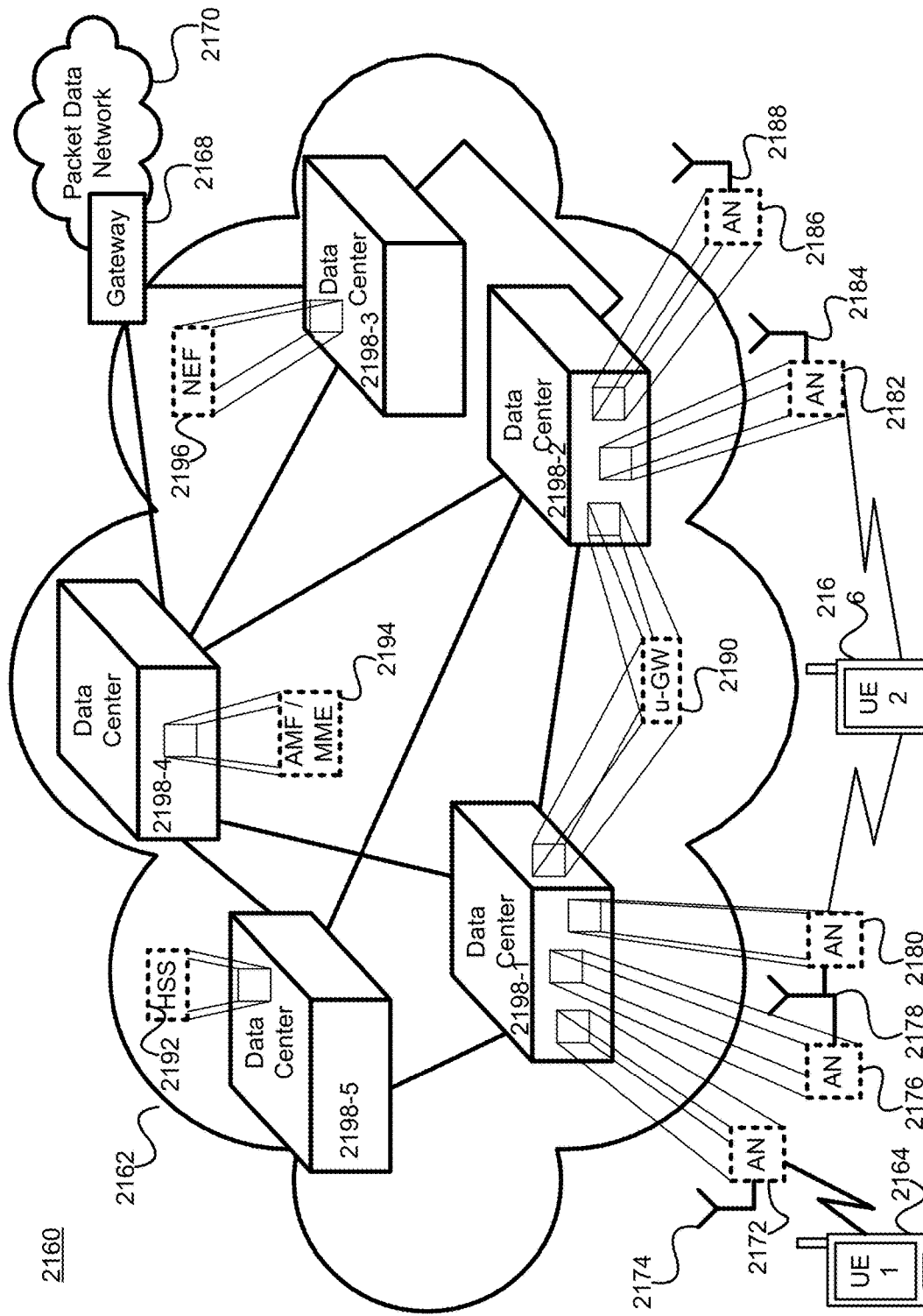
FIG. 17 is a diagram illustrating a cloud-based implementation of a Core Network and Radio Access Network using virtualized functions.

FIG. 17 illustrates a system 2160 in which a core/RAN network 2162 provides radio access and core network services to electronic devices such as UE1 2164 and UE2 2166. Traffic from electronic devices can be routed through network functions, to a gateway 2168 that provides access to a packet data network 2170 such as the Internet. Radio access services are typically provided by a RAN, which in this illustration is provided as a Cloud-RAN (C-RAN). Where a conventional RAN architecture was designed to be composed of discrete elements, such as eNodeBs, that were connected to the Core Network through a backhaul network, a C-RAN takes advantage of function virtualization to virtualize the Access Nodes of the network. Much as a physical Access Node, such as an eNodeB, was connected to an antenna by a front haul link, in the illustrated embodiment of a C-RAN Access Nodes are connected to antenna (or to a remote radio head (RRH)) through a front haul connection, but are functions that are instantiated upon compute resources in network 2162. For example, UE1 2164 is connected to the network through AN 2172, which can provide radio access services through antenna 2174. AN 2172 is instantiated upon the compute and storage resources provided by a data center, in this case data center 2198-1. Similarly, AN 2176 and 2180, which are connected to the same set of antennae 2178, are also instantiated upon the resources of data center 2198-1. AN 2180 provides radio access services to UE 2 2166, which also makes use of the access services provided by AN 2182. AN 2182 is connected to antenna 2184, and is instantiated upon the resources of data center 2198-2. AN 2186 is connected to antenna 2188, and is also instantiated upon the resources of data center 2198-2. It should be understood that the fronthaul connections linking the virtualized access nodes to the antennas or RRHs, may be direct connections, or they may form a fronthaul network. The integration of a CRAN into a core network may obviate or reduce the concerns associated with backhaul connections as the AN functions may be co-located with CN functions. As such, Data Center 2198-1 also serves as a location at which a user-specific gateway function (u-GW) 2190 is instantiated. This function is also instantiated in data center 2198-2. Having a function instantiated at more than one data center may be part of a function migration process in which the function is moved through the network, or one of the instantiations may be an intentionally redundant instantiation. Both functions can be instantiated and configured, with only one of them active at a time, or they may both be active, but only one of them may be transmitting data to the UE. In other embodiments, such as those focussed on Ultra-Reliable connections, such as Ultra-Reliable Low Latency Communications (URLLC), both functions may be active and transmitting data to (or receiving data from) an ED such as UE2 2166. Network functions such as a Home Subscriber Server (HSS) 2192, an Access and Mobility Management Function (AMF) 2194 or its predecessor Mobility Management Entity (MME), and a Network Exposure Function (NEF) 2196 are shown as being instantiated on the resources of Data Center 2198-5, 2198-4 and 2198-3 respectively.

The virtualization of the network functions allows a function to be located in the network at a location topologically close to the demand for the service provided by the function. Thus, AN 2172, which is associated with antenna 2174, can be instantiated upon data center resources at the data center closest to the antenna 2174, in this case data center 2198-1. Functions such as an NEF 2196, which may not need to be close to ANs, may be instantiated further away (in either or both of a topological or physical sense). Thus, NEF 2196 is instantiated at data center 2198-3, and the HSS 2192 and AMF 2194 are instantiated at data centers 2198-5 and 2198-4 respectively, which are topologically closer to the radio edge of the network 2162. In some network implementations, data centers can be arranged hierarchically and different functions can be placed at different levels in the hierarchy.

Referring to FIG. 17, in some embodiments the system 2160 includes network infrastructure devices owned by an MNO, which are configured to support network slices and functionalities offered and provided by a VNO. The UEs 2164, 2166 may be owned and operated by the VNO or by end users.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for collecting network usage information, comprising:

transmitting instructions to instantiate a monitoring function at a location in a communication network, the location selected to allow monitoring or tracking of traffic flows associated with a plurality of UEs using a network slice instantiated in the communication network, the location being within the network slice, the plurality of UEs using the network slice to access a service and the traffic flows being within the network slice and due to usage of the service, the monitoring function configured to monitor the traffic flows and to provide indications of the traffic flows, wherein the indications of the traffic flows include indications of one or more of: traffic volume for the traffic flows; and flow rate of the traffic flows; and providing charging information for use in charging a virtual network operator (VNO) customer based on the indications of the traffic flows, the VNO customer separate from an operator of the communication network, wherein the plurality of UEs are subscribed to the VNO customer or operated by the VNO customer, and wherein the VNO customer offers the plurality of UEs access to the service.

2. The method of claim 1, further comprising transmitting instructions to instantiate the monitoring function upon creation of the network slice.

3. The method of claim 2, wherein charging the VNO customer comprises one or more of: charging the VNO customer based on a rate of demand for the service per geographical area; charging the VNO customer based on network resource usage; and charging the VNO customer based on a pay-as-you-go model for aggregated per-UE monitoring.

4. The method of claim 3, wherein the aggregated per-UE monitoring comprises monitoring, for each of the plurality of UEs, one or more of: type of service provided using the traffic flows; duration of service provided using the traffic flows; traffic flow type; traffic flow duration; traffic volume per service type; traffic volume per traffic flow type; network resource usage; number of traffic flows per service; and number of sessions per service.

5. The method of claim 1, further comprising monitoring performance of the network slice using a network Key Performance Indicator indicative of aggregate performance of the network slice in relation to the plurality of UEs.

6. The method of claim 1, wherein policies for charging the VNO customer vary over time.

7. The method of claim 6, wherein the charging information comprises an indication of network slice usage time and network slice usage geographic location.

8. The method of claim 1, wherein the monitoring function is further configured to monitor performance of a session involving at least one of the plurality of UEs and the service, wherein the service is an on-demand service.

9. The method of claim 1, further comprising providing a database indicative of services being offered by one or more mobile network operators including an operator of the communication network, one or more service providers providing a set of services including the service, or a combination thereof, the database accessible to customers including one or both of: the VNO customer; and operators of the plurality of UEs.

10. The method of claim 1, further comprising modifying performance parameters for providing the service according to one or both of: current network conditions; and preferences of the VNO customer.

11. The method of claim 1, wherein providing the service comprises creating an instance of the service in the network slice, and wherein the network slice is a new network slice or an existing network slice.

12. The method of claim 1, further comprising defining a customer service instance descriptor for the service and creating or modifying a network slice descriptor for the network slice, and using the customer service instance descriptor and the network slice descriptor to direct operation of the monitoring function.

13. The method of claim 1, further comprising providing a charging control function for generating the charging information according to a negotiated agreement between the VNO and an operator of the communication network.

14. The method of claim 13, wherein providing the charging control function comprises determining a location in the communication network for the charging control function, and instantiating the charging control function in the determined location.

15. The method of claim 14, wherein the location is within the network slice.

16. The method of claim 13, further comprising configuring the charging control function to generate the charging information based on one or more of: an amount of data provided according to the service; a single or aggregate data rate provided according to the service; a bandwidth used for providing the service; geographic locations of the plurality of UEs; quality of service (QoS) metrics for data provided according to the service; a number of identifiable interactions with the service; an amount of resources used in providing the service; a number of service sessions provided; satisfaction of key performance indicators described in the negotiated agreement; and times of access to the service.

17. The method of claim 1, wherein the monitoring function is configured to monitor operations in the communication network and generate one or more of: an amount of data provided according to the service; a single or aggregate data rate provided according to the service; a bandwidth used for providing the service; geographic locations of the plurality of UEs; quality of service (QoS) metrics for data provided according to the service; a number of identifiable interactions with the service; an amount of resources used in providing the service; a number of service sessions provided; satisfaction of key performance indicators described in the negotiated agreement; and times of access to the service.

18. The method of claim 1, further comprising providing a feedback mechanism configured to indicate, to one or more of: a service traffic controller, the VNO customer, and end users responsible for the plurality of UEs, one or more of: violations of QoS metrics for data provided according to the service; dynamic variations in a charging policy according to a negotiated agreement for providing the service; and charging related messages.

19. The method of claim 1, wherein the service is provided directly to the plurality of UEs, and the service comprises a single connectivity session provided in response to a service request.

20. An electronic device in a network, the electronic device comprising a processor, a network interface and a memory and configured to:
instantiate or operate a monitoring function at a location in a communication network, the location selected to allow monitoring of traffic flows associated with usage, by a plurality of UEs, of a service accessed via a network slice instantiated in the network, the location being within the network slice, the plurality of UEs using the network slice to access the service and the traffic flows being within the network slice and due to usage of the service, the monitoring function configured to:
monitor the traffic flows for the plurality of UEs;
generate indications of the traffic flows, wherein the indications of the traffic flows include indications of one or more of: traffic volume for the traffic flows; and flow rate of the traffic flows; and
generate and provide charging information for use in charging a Virtual Network Operator (VNO) customer based on the indications of the traffic flows, the VNO customer separate from an operator of the communication network, wherein the plurality of UEs are subscribed to the VNO customer or operated by the VNO customer, and wherein the VNO customer offers the plurality of UEs access to the service.

21. A method for collecting network usage information, comprising:
instantiating a monitoring function at a location in a communication network, the location selected to allow monitoring of traffic flows associated with usage, by one or more UEs, of a network slice instantiated in the network, the location being within the network slice, the plurality of UEs using the network slice to access a service provided by a Virtual Network Operator (VNO) and the traffic flows being within the network slice and due to usage of the service, the VNO separate from an operator of the network, and wherein the VNO is a VNO customer offering the plurality of UEs access to the service, the monitoring function configured to
monitor the traffic flows, wherein the one or more UEs use the network slice in accordance with a subscription to the service provided by the VNO;
generating, by the monitoring function, network usage information based on indications of one or more of: traffic volume for the traffic flows; and flow rate of the traffic flows; and
providing the network usage information to the VNO for use by the VNO in charging for usage of the network slice by the one or more UEs.

22. The method of claim 21, further comprising providing indications of the traffic flows to the VNO.

23. The method of claim 21, wherein monitoring of the traffic flows comprises monitoring one or more of: type of service provided using the traffic flows; duration of service provided using the traffic flows; traffic flow type; traffic flow duration; traffic volume per service type; traffic volume per traffic flow type; network resource usage; number of traffic flows per service; and number of sessions per service.

24. The method of claim 21, further comprising providing, to one or more entities responsible for the one or more UEs, information indicative of charging rates for usage of the service.

25. The method of claim 24, wherein the charging rates vary based on one or both of network slice usage time and network slice usage geographic location.

26. The method of claim 21, wherein the monitoring function is further configured to monitor performance of a session involving at least one of the one or more UEs and the service, wherein the service is an on-demand service.

27. An electronic device in a network, the electronic device comprising a processor, a network interface and a memory and configured to:
instantiate or operate a monitoring function at a location in a communication network, the location selected to allow monitoring of traffic flows associated with usage, by one or more UEs, of a service accessed via a network slice instantiated in the network, the one or more UEs subscribed to the service via a Virtual Network Operator (VNO), the location being within the network slice, the plurality of UEs using the network slice to access the service and the traffic flows being within the network slice and due to usage of the service, the VNO separate from an operator of the communication network, and wherein the VNO is a VNO customer offering the plurality of UEs access to the service, the monitoring function configured to:
monitor the traffic flows for the one or more UEs;
generate network usage information based on indications of one or more of: traffic volume for the traffic flows; and flow rate of the traffic flows; and
provide the network usage information to the VNO, for use by the VNO in charging for usage of the network slice by the one or more UEs.

* * * * *